United States Patent
Jakobsson et al.

(10) Patent No.: US 11,336,096 B2
(45) Date of Patent: May 17, 2022

(54) MANAGING POWER FOR RESIDENTIAL AND COMMERCIAL NETWORKS

(71) Applicant: Amber Solutions, Inc., Dublin, CA (US)

(72) Inventors: Bjorn Markus Jakobsson, Portola Valley, CA (US); Peter Mankowski, Cambridge (CA); Stephen C. Gerber, Austin, TX (US)

(73) Assignee: Amber Solutions, Inc., Dublin, CA (US)

( * ) Notice: Subject to any disclaimer, the term of this patent is extended or adjusted under 35 U.S.C. 154(b) by 105 days.

(21) Appl. No.: 16/682,627

(22) Filed: Nov. 13, 2019

(65) Prior Publication Data

US 2020/0153245 A1 May 14, 2020

Related U.S. Application Data

(60) Provisional application No. 62/760,285, filed on Nov. 13, 2018.

(51) Int. Cl.
*H02J 3/14* (2006.01)
*G05B 15/02* (2006.01)
(Continued)

(52) U.S. Cl.
CPC .............. *H02J 3/14* (2013.01); *G05B 15/02* (2013.01); *H02J 13/0017* (2013.01); *H02J 3/003* (2020.01); *H02J 2310/14* (2020.01)

(58) Field of Classification Search
CPC .......... H02J 3/14; H02J 13/0017; H02J 3/003; H02J 2310/14; H02J 9/005; G05B 15/02;
(Continued)

(56) References Cited

U.S. PATENT DOCUMENTS 6,756,998 B1 6/2004 Bilger
7,610,616 B2 10/2009 Masuouka et al.
(Continued)

FOREIGN PATENT DOCUMENTS

WO 2016010529 A1 1/2016
WO 2017196572 A1 11/2017
(Continued)

OTHER PUBLICATIONS

Stajano et al., "The Resurrecting Duckling: Security Issues for Ad-hoc Wireless Networks," International Workshop on Security Protocols, 1999, 11 pages.
(Continued)

*Primary Examiner* — Charles R Kasenge
(74) *Attorney, Agent, or Firm* — Ryan, Mason & Lewis, LLP

(57) ABSTRACT

An apparatus in an illustrative embodiment comprises at least one processing device comprising a processor coupled to a memory. The processing device is configured to receive power consumption data relating to at least one monitored device, and to classify the monitored device based at least in part on the power consumption data. The processing device is further configured to select a power policy for the classified device, and to control application of power to the classified device in accordance with the selected power policy. For example, controlling application of power to the classified device in accordance with the selected power policy may comprise determining contextual information for the classified device, generating a control signal based at least in part on the contextual information and the selected power policy, and transmitting the control signal to at least one node of a node network. Other illustrative embodiments include methods and computer program products.

21 Claims, 9 Drawing Sheets

(51) Int. Cl.
*H02J 13/00* (2006.01)
*H02J 3/00* (2006.01)

(58) Field of Classification Search
CPC ........ G05B 2219/2642; Y02B 70/3225; Y02B 70/30; Y04S 20/242; Y04S 20/222
See application file for complete search history.

(56) References Cited

U.S. PATENT DOCUMENTS

| | | |
|---|---|---|
| 9,990,786 B1 | 6/2018 | Ziraknejad |
| 2007/0143826 A1 | 6/2007 | Sastry et al. |
| 2009/0195349 A1* | 8/2009 | Frader-Thompson ........................ G01R 21/00 340/3.1 |
| 2009/0203355 A1 | 8/2009 | Clark |
| 2010/0145542 A1* | 6/2010 | Chapel .............. H02J 13/00034 700/295 |
| 2011/0299547 A1* | 12/2011 | Diab ................... H04L 12/6402 370/401 |
| 2013/0245841 A1* | 9/2013 | Ahn .......................... G06F 1/26 700/286 |
| 2013/0300534 A1 | 11/2013 | Myllymaki |
| 2014/0096272 A1 | 4/2014 | Makofsky et al. |
| 2014/0246926 A1 | 9/2014 | Cruz et al. |
| 2014/0266698 A1 | 9/2014 | Hall et al. |
| 2015/0185261 A1* | 7/2015 | Frader-Thompson ........................ G01D 4/002 702/61 |
| 2015/0253364 A1* | 9/2015 | Hieda ...................... H04Q 9/00 702/62 |
| 2015/0282223 A1 | 10/2015 | Wang et al. |
| 2015/0309521 A1 | 10/2015 | Pan |
| 2015/0355649 A1 | 12/2015 | Ovadia |
| 2016/0018800 A1 | 1/2016 | Gettings et al. |
| 2016/0035159 A1 | 2/2016 | Ganapathy Achari et al. |
| 2016/0374134 A1 | 12/2016 | Kweon et al. |
| 2017/0026194 A1 | 1/2017 | Vijayrao et al. |
| 2017/0033942 A1 | 2/2017 | Koeninger |
| 2017/0099647 A1 | 4/2017 | Shah et al. |
| 2017/0171802 A1 | 6/2017 | Hou et al. |
| 2017/0195130 A1 | 7/2017 | Landow et al. |
| 2017/0212653 A1 | 7/2017 | Kanojia et al. |
| 2017/0230193 A1 | 8/2017 | Apte et al. |
| 2017/0256941 A1* | 9/2017 | Bowers ............... H02J 13/0006 |
| 2017/0366950 A1 | 12/2017 | Abron |
| 2018/0061158 A1 | 3/2018 | Greene |
| 2018/0174076 A1 | 6/2018 | Fukami |
| 2018/0196094 A1 | 7/2018 | Fishburn et al. |
| 2018/0301006 A1 | 10/2018 | Flint et al. |
| 2018/0342329 A1 | 11/2018 | Rufo et al. |
| 2018/0359039 A1 | 12/2018 | Daoura et al. |
| 2018/0359223 A1 | 12/2018 | Maier et al. |
| 2019/0028869 A1 | 1/2019 | Kaliner |
| 2019/0036928 A1 | 1/2019 | Meriac et al. |
| 2019/0050903 A1 | 2/2019 | DeWitt et al. |
| 2019/0068716 A1 | 2/2019 | Lauer |
| 2019/0086979 A1 | 3/2019 | Kao et al. |
| 2019/0104138 A1 | 4/2019 | Storms et al. |
| 2019/0253243 A1 | 8/2019 | Zimmerman et al. |
| 2019/0268176 A1 | 8/2019 | Pognant |
| 2019/0306953 A1 | 10/2019 | Joyce et al. |
| 2019/0334999 A1 | 10/2019 | Ryhorchuk et al. |

FOREIGN PATENT DOCUMENTS

| | | |
|---|---|---|
| WO | 2018080614 A1 | 5/2018 |
| WO | 2018081619 A2 | 5/2018 |

OTHER PUBLICATIONS

L. Sweeney, "Simple Demographics Often Identify People Uniquely," Carnegie Mellon University, Data Privacy Working Paper 3, 2000, 34 pages.

Narayanan et al., "Robust De-anonymization of Large Sparse Datasets," The University of Texas at Austin, 2009, 15 pages.

Alahmad et al., "Non-Intrusive Electrical Load Monitoring and Profiling Methods for Applications in Energy Management Systems," IEEE Long Island Systems, Applications and Technology Conference, 2011, 7 pages.

U.S. Appl. No. 16/585,438 filed in the name of Bjorn Markus Jakobsson on Sep. 27, 2019 and entitled "Methods and Apparatus for Determining Preferences and Events and Generating Associated Outreach Therefrom."

U.S. Appl. No. 16/598,614 filed in the name of Bjorn Markus Jakobsson et al. on Oct. 10, 2019 and entitled "Configuration and Management of Smart Nodes with Limited User Interfaces."

U.S. Appl. No. 16/676,978 filed in the name of Bjorn Markus Jakobsson on Nov. 7, 2019 and entitled "Third Party Application Enablement for Node Networks Deployed in Residential and Commercial Settings."

U.S. Appl. No. 16/149,094 filed in the name of Mark Telefus on Oct. 1, 2018 and entitled "Circuit Interrupter with Optical Connection."

U.S. Appl. No. 15/980,311, filed May 15, 2018 and entitled "Predictive Analytics System."

U.S. Appl. No. 16/527,826 filed in the name of Bjorn Markus Jakobsson on Jul. 31, 2019 and entitled "Managing Access Rights of Transferable Sensor Systems."

* cited by examiner

STANDARD AC SOURCE WAVEFORM

AMPLITUDE-REDUCED AC SOURCE WAVEFORM

AMPLITUDE-CHOPPED AC SOURCE WAVEFORM

ZERO-CROSSING HOLD-OFF AC SOURCE WAVEFORM

SPLIT-CYCLE AC SOURCE WAVEFORM

CYCLE-SKIPPING OR PEAK-SKIPPING AC SOURCE WAVEFORM

WAVE-SHAPED AC SOURCE WAVEFORM

MANAGING POWER FOR RESIDENTIAL AND COMMERCIAL NETWORKS

RELATED APPLICATION(S)

The present application claims priority to U.S. Provisional Patent Application Ser. No. 62/760,285, filed Nov. 13, 2018 and entitled "Managing Power for Residential and Commercial Networks," which is incorporated by reference herein in its entirety.

FIELD

The field relates generally to information processing systems, and more particularly to systems that manage power for appliances and other types of devices in residential and commercial settings.

BACKGROUND

Phantom power use is caused by appliances drawing power even when not being actively used. For example, a fan that is not operating is still consuming power, as a non-negligible current is flowing through its electric engine even though the engine is not rotating the blade of the fan. Ironically, this heats the room in which the fan is standing, at the same time as it incurs a cost and causes an unnecessary environmental impact. Of course, fans are not the only type of appliance that result in phantom power use. In fact, phantom power, according to common estimates, comprises up to 20% of the entire energy consumption of the U.S. While consumers can routinely unplug appliances and other devices, doing so manually may be quite laborious and result in frustration, lost time and potential problems arising from users forgetting to plug in unplugged appliances and other devices. Moreover, for some appliances and other devices, unplugging is not a realistic option, as the periodicity with which the appliances and other devices are needed is too high to make it practically meaningful to unplug them to reduce phantom power draw. Automatically disconnecting appliances and other devices, however, is fraught with complication as different appliances and other devices have different power needs. Therefore, automatically turning all appliances and other devices off at night, for example, is not an answer to the problem, or even a partial answer to it. The reduction of phantom power is therefore both an important problem to solve and a problem that has evaded being solved in spite of its economic and environmental impact.

SUMMARY

Illustrative embodiments provide techniques for managing power for residential and commercial networks, such as sensor networks and other types of node networks. For example, some embodiments can substantially reduce phantom power of appliances and other devices in residential and commercial settings, while avoiding problems associated with conventional approaches.

In one embodiment, an apparatus comprises at least one processing device comprising a processor coupled to a memory. The processing device is configured to receive power consumption data relating to at least one monitored device, and to classify the monitored device based at least in part on the power consumption data. The processing device is further configured to select a power policy for the classified device, and to control application of power to the classified device in accordance with the selected power policy.

Receiving power consumption data relating to at least one monitored device in some embodiments comprises receiving power consumption data from a node network associated with the monitored device.

The processing device in such embodiments illustratively comprises one or more servers coupled to the node network, with the one or more servers being configured to automatically perform at least portions of the receiving, classifying, selecting and controlling through interaction with one or more nodes of the node network. In these and other embodiments, at least portions of the receiving, classifying, selecting and controlling are repeated responsive to detection of a designated triggering event.

The node network in some embodiments more particularly comprises a sensor network that includes a set of sensor devices with at least one of the sensor devices being configured to provide the power consumption data. For example, the sensor device may comprise at least one of a power source, a power outlet and a power switch, configured to modify an amount of power provided to the monitored device responsive to at least one received control signal. The sensor network may be deployed, for example, in at least one of an interior space and an exterior space of a building or other structure in a residential or commercial setting.

The classification of the monitored device based at least in part on the power consumption data in some embodiments comprises performing a first classification based at least in part on load characteristics obtained from the power consumption data, and performing a second classification based at least in part on likely power needs of the monitored device. Selection of a power policy for the classified device in such an embodiment is illustratively based at least in part on results of the first and second classifications.

In some embodiments, controlling application of power to a classified device in accordance with a selected power policy may comprise determining contextual information for the classified device, generating a control signal based at least in part on the contextual information and the selected power policy, and transmitting the control signal to at least one node of a node network associated with the classified device.

Additionally or alternatively, controlling application of power to a classified device in accordance with a selected power policy may comprise detecting a condition associated with a particular one of a plurality of possible power needs of the classified device under the selected power policy, and controlling application of a corresponding one of a plurality of different available levels of power to the classified device responsive to the detected condition.

For example, the plurality of different available levels of power illustratively comprises two or more of at least a first level providing no power, a second level providing limited power below a regular level of power for the classified device, and a third level providing the regular level of power.

The plurality of different available levels of power in such an embodiment illustratively comprises at least two different power levels provided using at least one of respective different source waveforms and respective different source waveform characteristics.

Other embodiments can implement other power management arrangements for controlling power to one or more appliances or other devices.

For example, in some embodiments, controlling application of power to a classified device in accordance with a selected power policy comprises controlling initiation of a low power mode for the classified device, at a level of power below a regular level of power associated with a regular power mode for the classified device, detecting actuation of the classified device, and controlling a transition from the low power mode to the regular power mode responsive to the detected actuation.

Additionally or alternatively, controlling application of power to a classified device in accordance with a selected power policy can comprise selectively applying power to a first classified device of a first type to the exclusion of one or more other classified devices of different types than the first type.

Some embodiments implement machine learning functionality in conjunction with power management of an appliance or other device. For example, in an illustrative embodiment of this type, controlling application of power to a classified device in accordance with a selected power policy illustratively comprises implementing a machine learning system that learns a power consumption pattern of the classified device over time, and controlling application of power to the classified device based at least in part on the selected power policy and the power consumption pattern.

These and other illustrative embodiments include but are not limited to systems, methods, apparatus, and computer program products. The illustrative embodiments are advantageously configured to address and solve one or more significant problems of conventional approaches, as outlined in more detail elsewhere herein.

DETAILED DESCRIPTION

Figure 1:
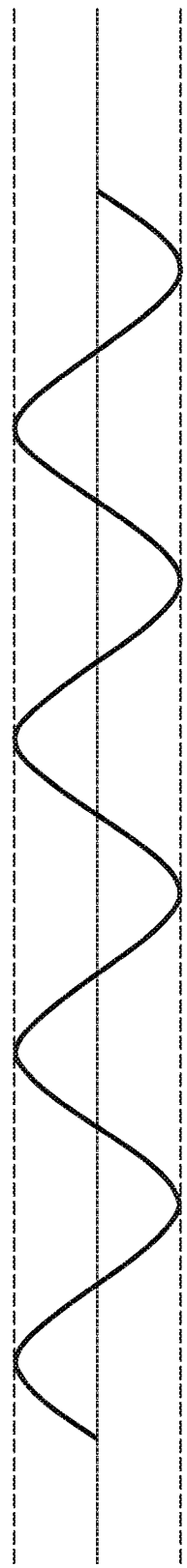
FIGS. 1 through 7 show examples of waveforms that may be utilized in illustrative embodiments.

Illustrative embodiments will be described herein with reference to exemplary information processing systems and associated computers, servers, storage devices and other processing devices. It is to be appreciated that the embodiments described below are presented by way of example only, and should not be construed as limiting in any way. For example, the term "appliance" as used herein is intended to be broadly construed, and references herein to "appliance/ device" are intended to refer to an appliance and/or another device. A given such device may in some contexts herein also be referred to herein as a "monitored device" and/or as a "classified device," where a monitored device comprises an appliance or other device that may or may not have been classified. These and other references to devices subject to power management as disclosed herein are also intended to be broadly construed, and can comprise any type of appliance, user device or other type of device for which phantom power can be reduced using the disclosed techniques.

Some illustrative embodiments disclosed herein provide important advantages relative to conventional practice. For example, some embodiments provide solutions to a problem that has long haunted society, namely, how to conserve energy by dramatic reduction of phantom power consumption. Phantom power has been estimated to correspond to approximately 20% of the energy consumption of the U.S. As such, it imposes a real burden, both financial and environmental, on organizations, individuals and government. Phantom power is the result of unutilized appliances and other devices not being disconnected from their power sources when not in use, where such disconnection could be performed by unplugging the appliances or other devices.

The disclosed technology in some embodiments comprises, for example, techniques to automatically identify the type of appliance or other device that is connected to an outlet; to look up and apply a power strategy associated with an identified appliance or other device; to provide appliances and other devices with lower power than they require for normal operation, but sufficient to allow the changes in operational needs; to create and maintain energy policies related to appliances and other devices, and to use these policies to determine what appliances and other devices to power during power shortages, such as brownouts, blackouts and peak energy need periods; to identify relocation of appliances and other devices and to associate moved appliances and other devices with previously established power usage profiles; and to quantify savings associated with these strategies.

It should be noted that the above-noted outlet and other references to outlets herein are examples of what are more generally referred to herein as "power outlets." Other power-related components, such as power sources and/or power switches, may be utilized in other embodiments, in addition to or in place of power outlets, in controlling the application of power to an appliance or other device. Power switches can include, for example, circuit breakers and/or circuit interrupters, as well as other types of circuitry. Some appliances/devices are controlled using the techniques herein without the need for a power outlet. For example, a power switch in an illustrative embodiment may comprise a circuit breaker having a branch that is hard-wired to an air conditioning compressor for a home, without any other loads on the branch. Numerous other arrangements each involving one or more power sources, power outlets and/or power switches may be used in managing power of appliances/ devices as disclosed herein.

The previously-mentioned techniques and other techniques disclosed herein can be used individually or in multiple distinct combinations. Examples of various combinations of such techniques are detailed in this disclosure. Some embodiments illustratively involve an establishment of identity and use for appliances and other devices, where the identity and use are associated with practical use scenarios, safety requirements, the attainment of the goals associated with the individual appliances and other devices, usability, a maintenance of system security, etc. The establishment of identity and use of the appliances and other devices illustratively comprises generating and processing sensor data as well as generating and processing policies and procedures, and results in a system-wide ability to predictively determine how to control energy provision, including providing essentially no power to an appliance or other device; providing one out of a multiplicity of reduced power profiles to the appliance or other device; providing full power to the appliance or other device; and switching between these three in a manner that respects the usage needs, the safety requirements, system security, and limitation of phantom power consumption. This disclosure describes such approaches using a series of illustrative examples, but the disclosed technology is not limited to these illustrative examples, which are simply used to clarify the nature and breadth of the disclosed technology, and the types of approaches it encompasses.

Some embodiments are configured to identify the type of appliance or other device in terms of its energy needs, based on a classification of its type and use. This is illustratively automated, for example, as described in PCT International Application No. PCT/US17/46533, filed Aug. 11, 2017 (corresponding to U.S. patent application Ser. No. 16/340,474) and entitled "Load Identifying AC Power Supply with Control and Methods," which is incorporated by reference herein in its entirety. This classification in some embodiments works by comparing the consumption response of an appliance or other device under various conditions, where example conditions correspond to different voltages and series of voltages. For example, this allows for a determination of whether a particular load is predominantly resistive or capacitive. Based on the current draw over time, it is also possible to distinguish different appliances and other devices from each other, even if they have similar general resistive and capacitive responses. For example, whereas a refrigerator and an air-conditioner both have a compressor, which results in a distinguishable response to voltages and series of voltages, the two compressors typically have different current draws, and can therefore often be distinguished on this basis.

Moreover, automatically observing a unit over time allows improved classifications. For example, even if the compressor of a refrigerator and the compressor of an air conditioner were to have the same response to probing using different voltages, and may have the same current draws, their load over time is typically very different. An air conditioner is mostly on for extended periods of time, and most commonly when the outdoor temperature is high; a refrigerator, on the other hand, is on in the summer as well as in the winter, but only for short durations, until the proper temperature has been reached in the small and enclosed space that corresponds to the interior of the refrigerator.

Therefore, by automatically probing an appliance or other device using different voltages and series of voltages, by observing the current draws of the appliance or other device, and by looking at time series of draws, especially in the context of auxiliary information such as outdoor temperature, thermostat settings, user commands, and the like, the disclosed system automatically classifies a large portion of appliances and other devices.

However, in some contexts, the automated classification has an error margin that exceeds a threshold corresponding to the highest tolerable risk of misclassification. To address this problem, it is beneficial to improve the determination based on automatically generated knowledge of the environment in which the appliance or other device is located. For example, consider a small electric heater: if found in a kitchen, it is plausible that it is a toaster; however, if found in a bedroom, especially in the night, it is more likely to be an electric blanket. Therefore, the system infers the use of a space, as described in U.S. patent application Ser. No. 16/598,614, filed Oct. 10, 2019 and now issued as U.S. Pat. No. 10,887,447, entitled "Configuration and Management of Smart Nodes with Limited User Interfaces," which is incorporated by reference herein in its entirety, and uses this to inform the classification of an observed appliance or other device. To the extent that some appliances and other devices fail to be classified or become misclassified, it is beneficial for the system to be able to receive updated information from an end user and incorporate that in the automatically derived model. Therefore, it is beneficial for the system to generate a human-readable description of appliances and other devices, and facilitate the verification of the labeling of this by an end user.

In addition, to the extent that appliances and other devices are moved within a space, from one location to another, it is beneficial for the system to recognize already classified appliances and other devices, based on the same techniques as described above, and to determine that an appliance/device has been moved from one location to another based on its apparent disconnection from the first location followed by its apparent resurfacing, as indicated by a related set of characteristics, in another location.

Such an inference can be informed by a heuristic assessment of the likelihood that an appliance or other device of this type would be moved from its original location to a new location, as well as the likelihood that the appliance or other device can be moved at all. A freezer, for example, is rarely moved from a kitchen to a bathroom, and is not commonly moved much at all. A central air conditioner is not moved at all, although it may be plugged into a new but co-located outlet in the same general space. Thus, using tables identifying characteristics of devices, including usage characteristics, location characteristics and movement characteristics, the system classifies and re-classifies appliances and other devices within an observed space.

Another illustrative embodiment provides a method to determine the likely needs of a classified appliance or other device, based on its classification, observed use and optional user input. This can be done by maintaining a table of appliances and other devices and their common needs, as well as information related to observed use and optional user input. The likely needs illustratively correspond directly to a policy of how to connect and disconnect the appliance or other device from power to reduce the amount of phantom power consumed by the appliance or other device.

A first example of an appliance/device and its power management as disclosed herein involves the controlled powering of a fish pond or an aquarium. Assuming that the power consumption corresponding to the pump is separable from the power consumption of lights, it is beneficial to treat these separately. The power to the lights is illustratively scheduled according to end-user preferences, whether this information is requested directly from the end user using an interface or inferred from past consumption patterns. The pump, on the other hand, needs to operate independently of the lights. It is used for aeration, then it is typically sufficient for the pump to run for a set period of time every hour, e.g., for ten minutes each hour.

Illustratively, the operation of the pump is controlled based on the output of an oxygen sensor, but in the absence of such a sensor, it is beneficial to automatically set a timer that is used to control the power supply to the pump. This can be done by asking a user to select from one or more power supply profiles, where a first profile corresponds to the pump operating the entire day, and then for ten minutes every hour during the night; and a second profile corresponds to the provision of regular power for ten minutes every hour, and the provision of 75% of the power for the remainder of the period. A benefit associated with the timed control of the power supply is that this provides the end user with the benefits of having a timer without the drawbacks associated with purchasing, placing and programming one. Thus, one technique that provides energy savings is the use of a timer, whether programmed by an end user or automatically configured by the system.

A second example of an appliance/device and its power management as disclosed herein involves the controlled powering of a hot water circulation pump. Whereas this results in great convenience to end users, as well as water savings, it is also a big cause of unnecessary power consumption. One interesting aspect related to hot water circulation pumps is that it is somewhat arbitrary when they are powered. In one embodiment, the hot water circulation pump is therefore powered using a timer, as the fish pond/aquarium example above, e.g., having the power on for a minute and then off for ten minutes, and then on again. However, this does not take into consideration the need for circulation, and a better approach is to determine the periodicity of powering it based on the temperature in the building, which impacts the rate at which the pipes cool down.

It may also be beneficial to use predictive analytics, as described in U.S. patent application Ser. No. 15/980,311, filed May 15, 2018 and entitled "Predictive Analytics System," which is incorporated by reference herein in its entirety, for example, based on past water usage patterns, to identify when warm water is most likely to be used. One user may never use hot water in the middle of the night, for example.

Another beneficial approach is to base the powering determination on a presence detector. For example, if the system determines that there is likely nobody at all in a space, then there is no reason to circulate hot water in the pipes. Moreover, if there is a person, but this person is in the bedroom and appears to be asleep, then the circulation can be made with a large periodicity, e.g., only one minute for each half an hour, which maintains a reasonable but not quite pleasant temperature of the water in the hot water pipes.

If the person appears to wake up, or the system knows that the user has set a wake-up call in five minutes, then it is beneficial to power the hot water circulation pump. Moreover, if the user enters the bathroom at any time of the day, then the system may power up the hot water circulation pump. Thus, example techniques involve detecting past patterns, identifying user presence (which is described in the above-cited U.S. patent application Ser. No. 16/598,614), determining the likely type of room in which the user is present, determining auxiliary signals and information (such as a wake-up call or the temperature in the building). In contrast to other uses, the exact time the hot water circulation pump is powered is immaterial, as long as the hot water is mostly at the right temperature when it is likely to be needed.

A third example of an appliance/device and its power management as disclosed herein involves the controlled powering of a set-top box or video equipment. By first identifying that a co-located appliance/device is a TV, the system can control the power to a set-top box, a DVD or Blu-ray player and provide such units with power; and then to shut off power to such units when the power consumption of the TV indicates that the TV is no longer turned on. This limits the time that the video equipment is powered to when the TV is powered. A system that comprises a control unit, such as an application ("app") on a portable device, that is used to control select appliances and other devices (such as TV and video equipment) can alternatively power on such devices as they receive a signal corresponding to a user selection for the device.

The above-cited U.S. patent application Ser. No. 16/598,614 discloses how to use a portable device to control appliances and other devices. As an example, once a user uses his or her phone or tablet to initiate a sequence of control signals relating to the operation of at least one of the components associated with watching a TV program or a movie, the system would power on all units, or a portion of them corresponding to the selection made by the user. At least some of the signals are illustratively delayed in terms of their transmission to the appropriate device to allow for this device to be powered on and boot up. To minimize this waiting time, an alternative approach is to power up video equipment as a presence sensor associated with a room classified as a TV room indicates that a person is present. If the person leaves, the equipment may be powered off after a set delay, such as ten minutes. The delay here is to avoid that the equipment is powered on and off too frequently due to a user walking back and forth into the room, e.g., tidying up the room; and to avoid that equipment is powered off as a result of a user running to the bathroom during a commercial break. Thus, examples of triggering events for turning on power comprise an observation of associated equipment (e.g., the TV) being used; the detection of presence; a signal from a universal remote, where one specific type of universal remote corresponds to an app that is part of the system. Similarly, the powering off of equipment can be triggered by the turning off of selected equipment, or the absence of a user, illustratively along with a delay.

A fourth example of an appliance/device and its power management as disclosed herein involves the controlled powering of a fan. Starting with the turning off of power, this is illustratively done in response to detecting that the power consumption of the fan falls below a threshold, indicating that the fan is no longer operating. To determine when to turn on power, one option is to use a presence sensor: if a person is present in the room or moving close to the outlet associated with the fan, then power is provided to the fan. An alternative approach is to provide a lower power if the presence of a person is detected. For example, by providing 40V instead of 110V, the fan can still be controlled and turned on, but its capabilities will be severely limited. However, as the system identifies that a partially powered appliance or other device is increasing its power draw, it increases the voltage to the "normal" voltage, whether this is 110V or 220V. In the case of a fan, a microphone could be utilized to measure the rotational speed and efficiency. This approach applies to many different types of appliances and other devices; however, the voltage corresponding to the partial powering of the appliance or other device varies by the type of the appliance and device, and can be stored in a profile associated with the appliance/device. The information can be particular to the type of appliance/device, or be determined when the appliance/device is first probed, by observing the response to probing, as described above.

By reducing the power to zero when the appliance or other device is off, then partially powering it on when a person is present, and only fully powering it on after appliance/device power draw is detected, large power savings are possible. Fans with remote controls can also have their power regulated in accordance with the principles associated with the video equipment, described above. Thus, useful techniques for appliances and other devices of some types comprise the detection of the appliance/device not being used; detection of presence or other activity; and detection of the use of an appliance or other device that is in a low power state. Whereas not all appliances and other devices can be operated in low power modes, most analog devices can. Other examples of appliances/devices that can each be controlled in terms of its power supply according to these principles include a toaster, an electric heat blanket, a wired electric shaver, a massage chair, etc.

A fifth example of an appliance/device and its power management as disclosed herein involves the controlled powering of a TV. By detecting the operation of a universal remote embodied in a remote control app, by detecting a voice command captured by a microphone sensor, or by detecting presence in a TV room, the TV can be powered on. This does not necessarily mean that the TV is turned on. For example, if presence is detected, the TV may be powered on, but not turned on until a voice command or a remote control signal is detected. Predictive variants are practical, wherein the TV as well as associated video equipment may be powered on at a time when a user is commonly turning on the equipment, and a person approaches the TV room; or based on a calendar event or other indication of a user intention to watch a TV program or movie. A TV can be powered off if it is determined from the power consumption that the TV already has been turned off, which corresponds to a dramatic reduction of the power consumption. A TV can also be powered off if it is already turned off, and there has not been the presence of a person in the TV room for a threshold amount of time, such as ten minutes.

A sixth example of an appliance/device and its power management as disclosed herein involves the controlled powering of a computer. It is commonly not desirable to turn off the power to a computer, as it may perform processing in the absence of a user, or may be in the process of being charged. Therefore, unless a user sets a policy, it is better for the system to detect that a device is a computer and determine that the power should not be turned off. An example policy is "if the lights are off and nobody is present for at least half an hour, and there is no sign from power consumption that the computer is charging, then turn the power off." This is therefore an example of a situation where a user-provided policy can be used to determine when to reduce or turn off power. It also shows the importance of not turning off power when a user is not present, and similar simplistic approaches to power management that are not founded in a deep understanding of the type of equipment and its power needs.

A seventh example of an appliance/device and its power management as disclosed herein involves the controlled powering of a modem. Modems should illustratively never be powered off. This makes it desirable to detect what equipment is a modem, and to carefully distinguish it from other equipment that is beneficial to occasionally power off. In fact, if a system has limited backup power, such as a battery, then this power is illustratively provided selectively in the case of a blackout or brownout, with priority given to sensors that are important for safety and security, and to any modem or similar communication equipment. A modem can be identified as such by the immediate cessation of communication abilities once an associated outlet is powered off. Therefore, as the system powers down any outlet, such as, for example, the outlet associated with a DVD player, it also identifies the loss of communication capabilities or a status change for a media access control (MAC) and/or IP address at a nearby router. If a DVD player and a modem are both connected to a power strip connected to one outlet, then powering off the outlet with the intention of powering off what the system recognizes as a DVD player will also power off the modem, thereby also immediately allowing the system to detect that the outlet is likely to also be connected to a modem. This knowledge enables the system to list the outlet in question as a critical outlet, which is to say an outlet that should not be powered off, and which should illustratively be given backup power when there is a brownout or blackout.

Other examples of how to balance the use of emergency power, e.g., during a brownout or blackout, involve management of power resources based on the type of equipment known to be connected to various outlets. For example, a water heater should not be powered during an emergency situation like that, unless there are sufficient power resources to maintain a minimum water temperature. Moreover, no power should be spent circulating hot water, e.g., by a hot water circulation pump, as this circulation both consumes power and potentially cools down the limited resources of already-heated water. A refrigerator or a freezer, though, should be powered, but potentially not all the time. Instead, the system may power some equipment in a round-robin fashion, e.g., powering a refrigerator for one minute, then a freezer for one minute, then a water heater for a minute, and then an aquarium pump for one minute. At the same time, general lighting would illustratively be reduced, with power intensive equipment such as electric vehicle (EV) chargers and outdoor spas being disconnected from power. To the extent that the system can reverse the power flow, e.g., to use an EV as a power source, this can be done based on a user policy set to permit such a reversal.

An eighth example of an appliance/device and its power management as disclosed herein involves the controlled powering of a coffee maker. Some coffee makers contain microcontrollers, and have schedules of operation associated with being turned on. For example, some coffee makers may start a rinsing process when turned on. This makes it undesirable to power them on, for example, responsive to detection of a user being present, as every time a user is present, the coffee maker will go through the rinse cycle. Whereas it is possible to let the coffee maker turn off some threshold amount of time after no longer detecting a user presence, e.g., 20 minutes later, this only partially reduces the problem of too frequent rinsing. It is better to put such appliances on a timer, e.g., turn them off at 10 pm, and only turn them on after a condition is met, such as a user is present. If the time is after 6 am, then coffee maker may be left on until it is ten o'clock, but before 6 am, it is turned off after ten minutes of no presence.

Other coffee makers can be given a reduced voltage power, as described above, and only given full power after an increased load is detected, which corresponds to the coffee maker being operated. To the extent that the system cannot automatically determine what type of coffee maker is plugged into an outlet, the system may leave the outlet powered all the time, or until a determination is made.

Determinations can be informed by user input. For example, after the system has identified that an appliance/device is likely a coffee maker, but without being able to determine its sub-category as described above, the system sends a notification to a user and asks for additional information. The user can click on a hyperlink and provide a classification. One type of classification entails scanning a QR code or barcode associated using a portable device such as a phone or a tablet, and providing the image to an application or website associated with the backend of the system, thereby enabling the backend to perform a look-up and determine the best power management.

Such operations can be performed for any type of appliance or other device introduced in a space, and could be done proactively, without waiting for the system to attempt to classify the appliance/device. This information informs classification decisions as well as actions. Other user input approaches comprise selecting descriptors, such as product types, brands and models from menu-driven interfaces, whether visual or voice/audio centric. Thus, this example demonstrates features related to user-guided classification. In one embodiment, such user-guided classification is accompanied with a user-provided usage policy or power policy, such as "turn off the power when nobody is around," "turn off the power when it is light outside," and "turn off the power when the room temperature falls below 68 degrees."

A ninth example of an appliance/device and its power management as disclosed herein involves the controlled powering of a furnace. This is an example of a situation where it is beneficial to turn off the power for some amount of time, say 10 minutes, and then turn the power on. As power is turned on, the system determines whether the connected appliance turns on (which indicates that heat is needed).

If this is detected, then the power is left on until the power consumption level drops to a level associated with phantom power consumption, at which time power is turned off for some amount of time, and a new loop is begun. If it is detected that a substantial amount of power is not consumed within a threshold amount of time, such as two minutes, and the only draw corresponds to phantom power consumption, then the power is turned off anew and the system waits again to turn power on, as described above.

The determination of whether the appliance consumes "useful" power or only phantom power is made based on historical consumption patterns and knowledge of the appliance or other device obtained, for example, using a look-up table, where the key for the look-up table is related to the classification of the appliance or other device. This corresponds to a context in which the system controlling power does not have access to the thermostat output signals; in situations where this information is available, the system illustratively powers the outlets exactly when the thermostat indicates that the furnace should operate.

The approaches described here work even if the furnace operates on gas. For example, a nearby outlet can detect temperature changes associated with the furnace, and can therefore infer whether the furnace is operating or is on standby. If it is on standby, its electronic components can be powered off, only to be powered on at a later time (such as ten minutes later, in this example) for the system to determine whether the furnace goes on then. The system can vary the "sleep time" based on the previous time period action. For example, if the system knows that the furnace was recently operating, and then puts it to sleep, it may let the power remain off for five minutes, then turn it on to determine whether the furnace goes on. At the same time, if the system knows that the furnace has not been operating within the past hour, it may let it sleep for a longer period of time, such as fifteen minutes, and then power it up to determine whether it turns on.

Thus, this example is a variant of the hot water pump example, wherein the system lets an appliance or other device sleep for some period of time, where sleeping corresponds to not being powered, and then wakes it up, corresponding to powering up the outlet the appliance or other device is connected to, and subsequently determines based on its observed activity whether to put it to sleep again, when to do that, and for how long.

A tenth example of an appliance/device and its power management as disclosed herein involves the controlled powering of a ground-fault circuit interrupter (GFCI) outlet. For GFCI outlets that are determined to be in bathrooms, it is beneficial to power them only when the presence of a person is detected, and then to power them off after a threshold amount of time (such as five minutes) after presence of a person is no longer detected. However, GFCI outlets in kitchens may be used even when nobody is present, e.g., for a slow cooker plugged in to the GFCI outlet. These should remain turned on even if nobody is present, and also, even if there is not a significant load on the outlet, as operation of a connected appliance may be controlled based on a timer and the appliance may not yet be operating. Therefore, GFCI outlets are illustratively powered on based on the presence of a person and/or the designation of the space in which the GFCI outlet is operating.

An eleventh example of an appliance/device and its power management as disclosed herein involves the controlled powering of a washer and dryer. This is an example of a context where the power supply cannot be presence based, in contrast to the example above. Also, since many appliances of this type have programs that cause temporary reduction of activity, it is also not practical to power these units in the manner described for a fan, where the detection of inactivity triggers the turning off of power. A multiplicity of alternative approaches are possible. One is to detect the presence of a user in combination of the consumption of power corresponding to a program. If a user is present, the appliance starts, and then there is no presence until after the apparent end of the program, then this is a useful training example. If the user is present during the program, that is not such a beneficial training example, as the user may have modified the operation of the appliances.

The training examples comprise power consumption patterns as a function of time and sounds (such as indicators of drying, and the signal identifying that the program is over). The system collects training examples and feeds these to a training algorithm, which may use a heuristic rule-based approach and/or may be based at least in part on machine learning, and which illustratively has access to the consumption patterns of common appliances and uses these to determine the type of appliance.

The system determines what different programs are used, and identifies when they are completed based on at least one of having identified the type of appliance, having identified the patterns of power consumption associated with a program, and having identified signals associated with the end of a program. For programs that include periods of apparent inactivity, the system establishes how many of these are associated with each program identified, whether by looking it up for the product, by looking it up for a generic product that is associated with all known options, or by generating a model by observing one or more operations. During the training period, the system may power the appliances all the time, or stop powering them after a fixed time of apparent non-operation, such as 2 hours, where this fixed time is longer than any scheduled and temporary non-operation that is part of a program.

Once the system has identified the programs, the appliances, or the signs of a program being completed, the system can modify the power provision rule set so that power is turned off as soon as the system has identified that the associated appliance has ended its program. Alternatively, power provision can be modified, e.g., the voltage reduced after the program completion is detected. Once it has been determined that a user is present, the system powers up the appliances, if powered off. This can be done with a reduced voltage until the beginning of a program is detected anew; alternatively, the system can provide full power under these circumstances. However, if the appliance is not started, and the user leaves (i.e., nobody is present anymore) then the system will again reduce or turn off power for the appliance (s).

The system illustratively detects power consumption on a per-outlet basis, but in the situation where two appliances are connected to only one power consumption meter, the training can involve identifying when only one appliance is operating and when two appliances are operating, and separating these cases from each other, illustratively using only the single-appliance uses for training purposes. This example demonstrates techniques involving training, generating heuristic rule sets, using machine learning, and/or applying rules and other techniques. This can be combined with presence detection, although in one alternative embodiment, that type of sensor input is not used, and in other embodiments one or more sensor signals are used to trigger exceptions as described previously, or no auxiliary sensor input is used at all.

A twelfth example of an appliance/device and its power management as disclosed herein involves the controlled powering of a spa. This is an appliance whose phantom power consumption is potentially very large. The needs are related to, but not the same, as for a fish pond, described above. It is beneficial to set a timer and let that control the equipment. For example, one user may have a spa that cleans itself using ultraviolet light, which requires a few hours of circulation of the water. One example user may wish to schedule this operation when electricity is at the lowest cost. The system will look up this time interval in a table it maintains, based on the geographic location of the installation and information about the electricity provider and the rate plan of the installation. In addition, the system will illustratively power up the spa equipment periodically, such as for one minute every hour, and determine whether the system needs to remain on, based on needs to increase the heat in the water. If such a need is detected, the system optionally and based on the water temperature or thermostat-caused actions such as water circulation control and heating control performs a verification.

The verification entails determining the current energy costs using a look-up table, and accessing a stored user policy relating to heating. Using this verification, the system determines whether to maintain power for the system. The system illustratively turns off power after it detects a lowering of the power needs, corresponding to the pump stopping, or after a set time, such as ten minutes. It then powers up the system again after a set time period, determining whether the power should remain on.

This example is different from the aquarium example in the sense that operation is not critical for the spa, but can be controlled based on energy costs, whereas the aquarium example imposes requirements based on the health of the fish in the aquarium and their need for the water to be aerated. The spa control system may involve a policy that causes the circulation of water for a minimum amount of time every 24 hours, or another time period of choice, in addition to a heating policy, e.g., ensuring that the water temperature never falls below 90° F., and that it is always at least 97° F. at 7 pm on Fridays and Saturdays. These policies can be selected by the user, and will be used in combination with manufacturer guidelines associated with the spa, energy costs, and peak time energy requirements.

In addition, and as described above, the system also illustratively enables exceptions, such as heating and circulation exceptions during brownouts and blackouts. When the spa is not fully powered, it can either be unpowered or only partially powered, where the latter enables the detection of user-provided controls, such as operating the pump or the lights. Alternatively, such actions can be inferred from a power draw on a circuit related to lights, the presence of a user in the proximity of the spa, based on movement next to a GFCI outlet or similar, and rules governing times during which the system will remain sufficiently powered to detect user inputs.

A thirteenth example of an appliance/device and its power needs involves an appliance/device that has not yet been classified. The system illustratively provides power to such an appliance/device until it can determine the type of appliance/device and apply one or more of the policies described. If the system identifies that an appliance or other device is connected to a previously empty outlet then the system illustratively performs a test of the appliance or other device to identify its type. If a sufficiently similar appliance or other device has previously been observed on another outlet of a node network, then the system may, potentially based on the inferred type, determine that it is likely the same appliance or other device, perform optional verification tests of this hypothesis, and then select a power policy based on the determination. A verification test may look very similar to the test the system performs to identify an unknown device, but may leave out portions of the test suite that are not relevant for the suspected appliance or other device.

The foregoing demonstrates advantageous features of the disclosed technology, which are enabled by an understanding of the type and use of various connected appliances and other devices, and a monitoring of conditions. This is different from techniques of minimizing power consumption during peak hours within traditional smart home installations. These traditional approaches are principally aimed at reducing power consumption during peak usage hours, e.g., by reducing the use of air conditioners; they are not focused on maximizing the utility, safety and security of users of systems that are severely constrained, and the two situations are very different, as are their associated solutions and requirements.

In the above, we have primarily focused on the powering of individual outlets. However, the same techniques can also be applied to powering individual circuits, and collections of these. The former can be achieved by incorporating the sensing and switching capabilities to switches or circuits they control, and the latter by controlling combinations of outlets or switches or by controlling smart breakers. A person skilled in the art will also recognize that to the extent that individual appliances and other devices are directly controllable by the system, e.g., smart bulbs or a compatible refrigerator, these can be directly controlled as well.

The disclosed system thus comprises test methods to determine the response of an appliance or other device to one or more power tests, where a selection of these power tests may be conditional on the system already having made some determinations based on previously performed power tests. This is used to generate an estimate comprising one or more appliances or other devices. The system further uses sensor data to infer the usage of the appliance or other device, such as energy consumption data; as well as location information that may be inferred from sensor data or may be provided by a user during a configuration phase. This data is illustratively used to refine the estimates of the one or more appliances or other devices. Once a determination is made of the most likely appliance or other device corresponding to an outlet or switch, then the system identifies a power policy.

We have provided numerous examples of such power policies above, but a person skilled in the art will recognize that these examples are merely illustrative, and not meant to limit the disclosure. Based on the determination of an appliance or other device, the selection of one or more policies, and optional sensor data or other auxiliary input, a power management strategy is selected and executed.

Illustratively, the system generates an audit log comprising information of when various outlets and circuits were powered, and generates estimates of power savings associated with the power management system. Power savings data can be provided to the end user, to an electricity provider, to interested third parties, and to other entities; the power savings data can be used to determine discounts or to determine pricing for the power management services described, as well as for purposes of providing recommendations of better products that can be used to replace products with undesirable power usage profiles. This results in an opportunity for discount coupons and targeted advertisements, as described in U.S. patent application Ser. No. 16/585,438, filed Sep. 27, 2019 and now issued as U.S. Pat. No. 10,951,435, entitled "Methods and Apparatus for Determining Preferences and Events and Generating Associated Outreach Therefrom," which is incorporated by reference herein in its entirety.

In the above embodiments, power-reducing strategies involving controlled provision of a lower voltage power and/or complete disconnection of power have been described. These and other low power approaches disclosed herein illustratively comprise but are not limited to: selecting and/or manipulating one or more power source waveform characteristics, such as amplitude, phase, wave shape, continuity, timing, and/or frequency.

Figure 2:
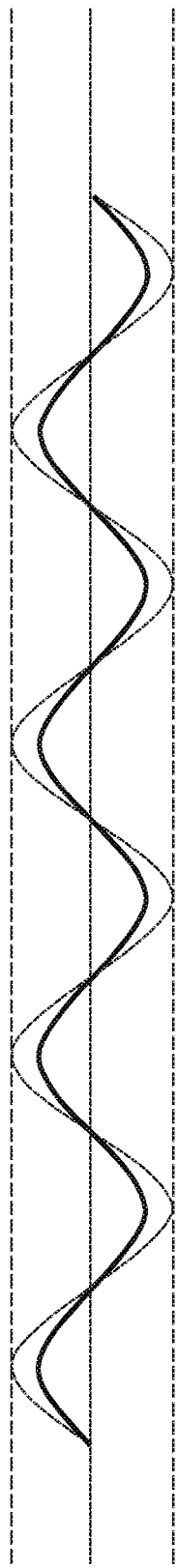
Figure 3:
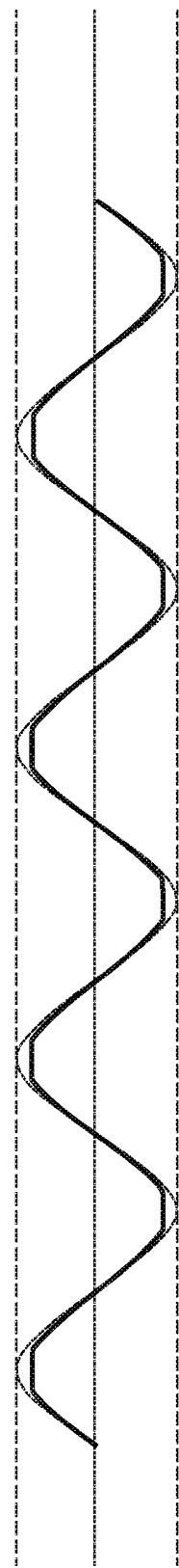
Figure 4:
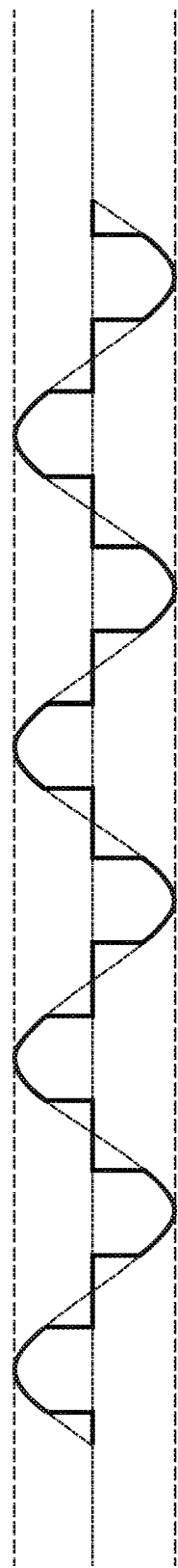
Figure 5:
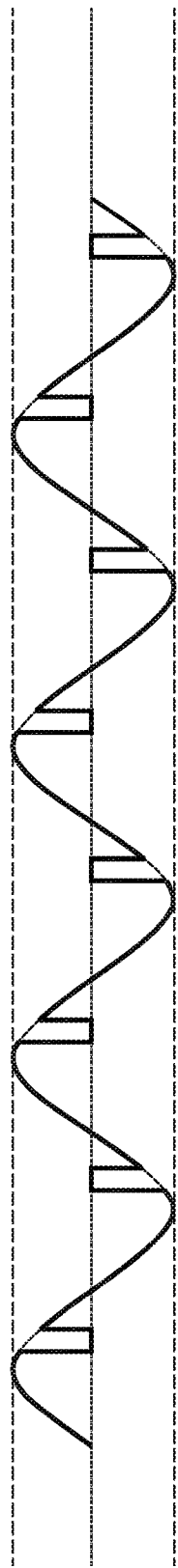
Figure 6:
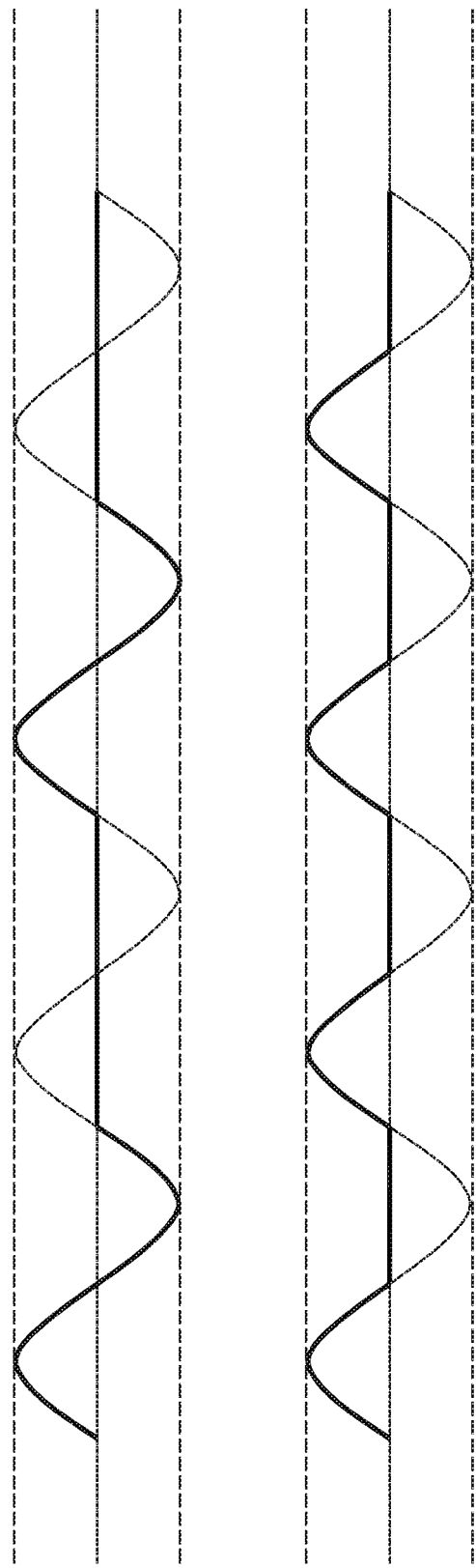
Figure 7:
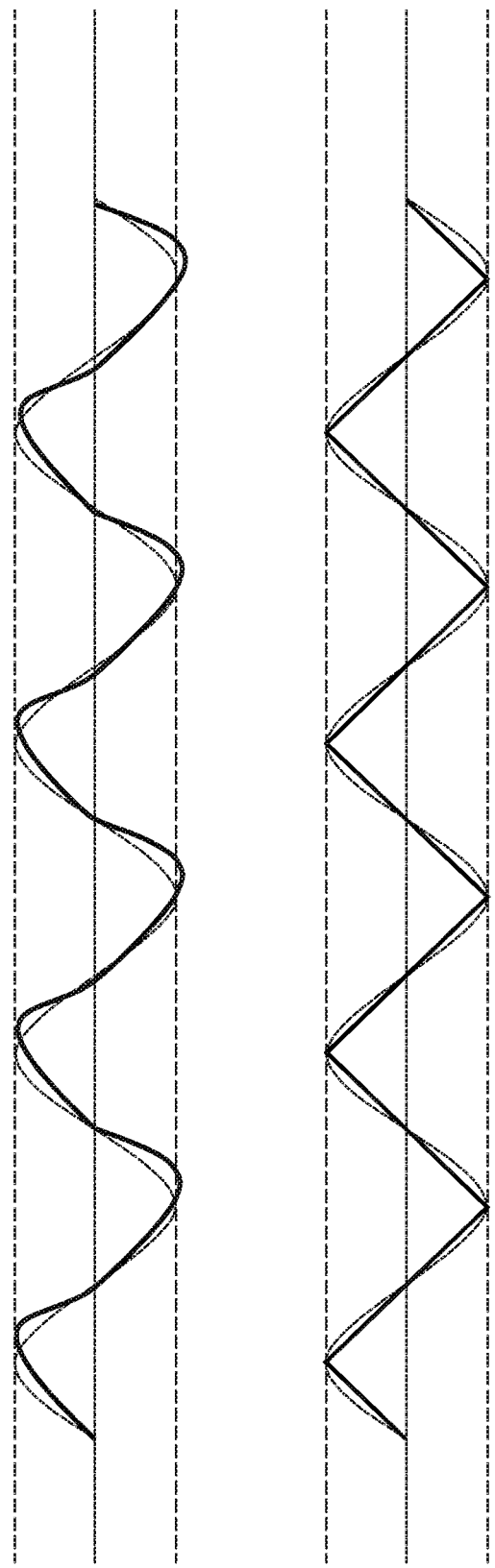

Examples of input waveforms that are selected and/or manipulated in conjunction with controlling application of power to appliances or other devices using the disclosed techniques are illustrated in conjunction with FIGS. 1 through 7, and will be described in greater detail elsewhere herein. FIG. 1 shows an ideal standard alternating current (AC) source waveform without manipulation for power management purposes as disclosed herein. The remaining input waveforms can be viewed as examples of waveforms that are selected and/or manipulated in conjunction with power management in illustrative embodiments. More particularly, FIG. 2 shows an amplitude-reduced AC source waveform, FIG. 3 shows an amplitude-chopped AC source waveform, FIG. 4 shows a zero-crossing hold-off AC source waveform, FIG. 5 shows a split-cycle AC source waveform, FIG. 6 shows a cycle-skipping or peak-skipping AC source waveform, and FIG. 7 shows a wave-shaped AC source waveform. Other types of AC source waveforms, or more generally other source waveforms, can be used in other embodiments.

Selection of a particular such AC source waveform from among a set of available AC source waveforms, and/or modification of one or more characteristics of such AC source waveforms, are illustratively used in managing power applied to appliances or other devices as disclosed herein.

Accordingly, in one or more of the examples previously described, power management of the appliance/device more particularly involves adjusting one or more characteristics of at least one AC source waveform of the types shown in FIGS. 1 through 7, and/or selecting a particular one of the AC source waveforms. For example, power can be reduced to a given appliance or other device by replacing its normal AC source waveform, such as the AC source waveform of FIG. 1, with another one of the AC source waveforms of FIGS. 2 through 7. Thus, a low power mode can be initiated in some embodiment by altering the AC source waveform that is applied to the appliance or other device via a power source, power outlet and/or power switch, or other arrangement of AC source circuitry. In conjunction with such an alteration, one or more characteristics of the AC source waveform, such as amplitude, phase, wave shape, continuity, timing, and/or frequency, can be modified or otherwise manipulated.

It is to be appreciated that these and other references herein to AC source waveforms and power management of AC powered systems are illustrative and non-limiting, and the disclosed techniques can be similarly utilized for power management of direct current (DC) powered systems, and combinations of AC powered and DC powered systems as well. For example, many commercial settings are foregoing AC power for DC power for lighting and other building controls, and the DC power applied to the corresponding appliances or other devices in these and other settings can be controlled using the disclosed techniques.

The above-noted AC source transformation in some embodiments can be implemented at least in part using AC switching techniques such as those described in U.S. Provisional Patent Application Ser. No. 62/611,460 filed Dec. 28, 2017 (corresponding to PCT International Application No. PCT/US18/59564 and U.S. patent application Ser. No. 16/759,996, now issued as U.S. Pat. No. 10,819,336), PCT International Application No. PCT/US17/58842, filed Oct. 27, 2017 (corresponding to U.S. patent application Ser. No. 16/340,774), and PCT International Application No. PCT/US17/30415, filed May 1, 2017 (corresponding to U.S. patent application Ser. No. 16/092,839, now issued as U.S. Pat. No. 10,469,077), each entitled "Electronic Switch and Dimmer" and incorporated by reference herein in its entirety, and U.S. patent application Ser. No. 16/149,094, filed Oct. 1, 2018 and now issued as U.S. Pat. No. 10,985,548, entitled "Circuit Interrupter with Optical Connection," which is incorporated by reference herein in its entirety.

A person skilled in the art will recognize that identifying zero-crossings, AC waveform manipulation, and real-time energy metering techniques can be implemented in illustrative embodiments. Utilizing these tools, along with the unique method of optimizing energy profiles begins with identifying a load's power efficiency response to one or more AC source manipulations through diagnostics.

Not all AC powered electrical devices are power efficiency optimized given their intended and ideal power source. Some embodiments disclosed herein are therefore configured to measure load power consumption profiles during traditional operation and to intentionally vary AC source manipulations and combinations of manipulations, possibly involving different ones of the waveforms of FIGS. 1 through 7, in order to determine optimal AC power profiles for highest efficiency power optimization of a given appliance/device. This can also involve utilization of computation, networking, cloud computing, machine learning and other types of artificial intelligence (AI), in order to profile and improve a load's energy efficiency profile under various stimuli with or without user assistance.

In some instances, the selection of power-reducing strategy is made based on the classification of the type of device or application. For example, some devices will run better with wave shaping using one or more of the waveforms of FIGS. 1 through 7 than with lower voltage. Information relating to the best low power approach for various types of appliances and other devices will be stored in a database accessible by the system, and the appropriate entry, based on the classification of a load, will be associated with a record describing the low power strategy for the associated outlet, circuit, or similar component.

Not all AC powered electrical devices can support some or all of the AC source manipulations of the type described above, using waveforms of the type shown in FIGS. 1 through 7. For example, a digital clock that keeps time based upon regular 60 Hz zero-crossings may not be able to handle cycle-skipping techniques unless the cycle-skipping technique is enhanced with a cycle-splitting approach to maintain an equivalent number of zero-crossings. Another example is the aforementioned battery-enabled laptop computer which may run far less efficiently if repeatedly pushed into battery discharge mode.

The testing strategy applied in illustrative embodiments comprises a set of individual tests, where performance of some tests is conditioned on determinations made by other tests. This provides protection of appliances and other devices that would be at risk of being damaged by the use of some tests. For example, after some appliances and other devices are excluded from the search, based on the results of early tests, the system can perform other tests that are suitable for these excluded appliances and other devices.

The testing strategy is illustratively organized as a directed acyclic graph (DAG) where each node of the DAG corresponds to a unique test and each edge connects two nodes and indicates the result of the test corresponding to the parent node of the two. The leaves of this graph correspond to determinations of devices, appliances or classes of these. The root (or source) of the DAG corresponds to the first test to apply. The DAG may be associated with multiple sources, where each source is associated with one outlet or switch, or with a prediction based on what appliances or other devices have recently been removed from association with other switches or outlets of the network and are therefore more plausible to correspond to the newly detected appliance or other device.

In the above, a power-reducing strategy corresponding to providing a lower voltage and/or varying other waveform characteristics has been described. Alternative low power approaches include but are not limited to only powering three out of four consecutive sine periods of the power delivery; only providing power corresponding to a portion of each sine period such as from 0V to 30V; wave shaping of the AC main; and other techniques. In some instances, the selection of power-reducing strategy is made based on the classification of the type of device or application. For example, some devices will run better with wave shaping than with lower voltage. Information relating to the best low power approach for various types of appliances and other devices will be stored in a database accessible by the system, and the appropriate entry, based on the classification of a load, will be associated with a record describing the low power strategy for the associated outlet, circuit, or similar component.

Additional features of illustrative embodiments will now be described in further detail with reference to FIGS. 1 through 14. As mentioned previously, examples of waveforms that may be utilized in illustrative embodiments are shown in FIGS. 1 through 7. Exemplary power management processes of the present disclosure, one or more of which utilize controlled variations in and/or intelligent selection of waveforms of the type shown in FIGS. 1 through 7, will then be described in conjunction with FIGS. 8 through 13. Finally, an example system will be described in conjunction with FIG. 14.

FIG. 1 depicts a standard, nominal AC source sine waveform typical of the North American power grid as delivered to residential and/or commercial properties at 120 Volts and 60 Hz.

FIG. 2 depicts a modified AC source sine waveform with reduced amplitude levels. The dotted line corresponds to the shape of the signal, had it not been modified. This technique is often referred to as dimming, in the same manner a wall-mounted rheostat decreases the amplitude of the supply to a light fixture. Simple resistive divider circuits can be used to achieve signal attenuation of this type.

FIG. 3 depicts a clipped or chopped waveform that departs from the nominal waveform only at the extreme voltages. The dotted line corresponds to the shape of the signal, had it not been modified. The level of clipping is adjustable. Clipping may be achieved with MOSFET transistors in a saturated amplifier condition based upon a fixed or adjustable voltage comparison circuit.

FIG. 4 depicts a modified AC source waveform where the source voltage is clamped to zero before, after, or both before and after the zero-crossing. FIG. 4 more particularly illustrates the both before and after case. In many respects, this waveform with energy delivered only at the peaks is the opposite of the clipping in FIG. 3. The same transistors and comparison circuits are employed but with the transistor function inverted and the voltage clamped to zero instead of a predefined flat output voltage as in FIG. 3. A zero-crossing detection amplifier or other type of zero-crossing detector can be used to generate a signal to control the specific on and off timing of the transistor control.

FIG. 5 is similar to FIG. 4 but the AC source voltage is clamped to zero at predefined and/or adjustable positions and widths within the phase of the sine wave period, often before, at, or after a zero-crossing. A circuit implementation used to generate such a waveform illustratively comprises transistors triggering at predefined voltages or phase to hold the output at zero during specific portion(s) of the phase. This is similar to pulse-width modulation for the purpose of reducing the total energy delivered to a load. In the case of an LED light, this technique helps to avoid lengthy off-times that may appear as visual flicker in the load. The timing of the switching may be controlled with a combination of a zero-crossing detector and a timer, or a linear phase detect circuit.

FIG. 6 depicts the skipping of full-cycles and half-cycles in respective upper and lower portions of the figure. This is an efficient means to shut off power to a load for a full-cycle or a half-cycle, or a series of full-cycles or half-cycles. Some loads may be adversely impacted by this approach, such as in the case of the aforementioned LED lamp flicker. The full-cycle and half-cycle skipping may be implemented using circuits similar to those used to generate the clamped AC waveform of FIG. 5.

FIG. 7 depicts other examples of possible changes in AC source waveform shape, such as the triangular wave pattern shown in the lower waveform. While these are more complicated manipulations based upon mathematically derived reactive circuit components, the resulting energy absorbed by the load can be more efficient than in the case of a traditional sine wave. Other examples may include ramp and sawtooth waveforms. A triangle wave generator may be implemented using a simple operational amplifier with a capacitive feedback to the amplifier's inverting input.

As mentioned previously, various characteristics of these and other waveforms may be adjusted in accordance with a power management process as disclosed herein. Additionally or alternatively, different waveforms of different types may be selected for use at different times for particular appliances/devices.

Circuitry of the type described above in conjunction with the modified AC source waveforms of FIGS. 2 through 7 can be implemented, for example, in power sources, power outlets, power switches or other system components utilized to apply power to appliances and other devices. Activation or other control of such components can be implemented using control signals generated by one or more processing devices as disclosed herein.

Figure 8:
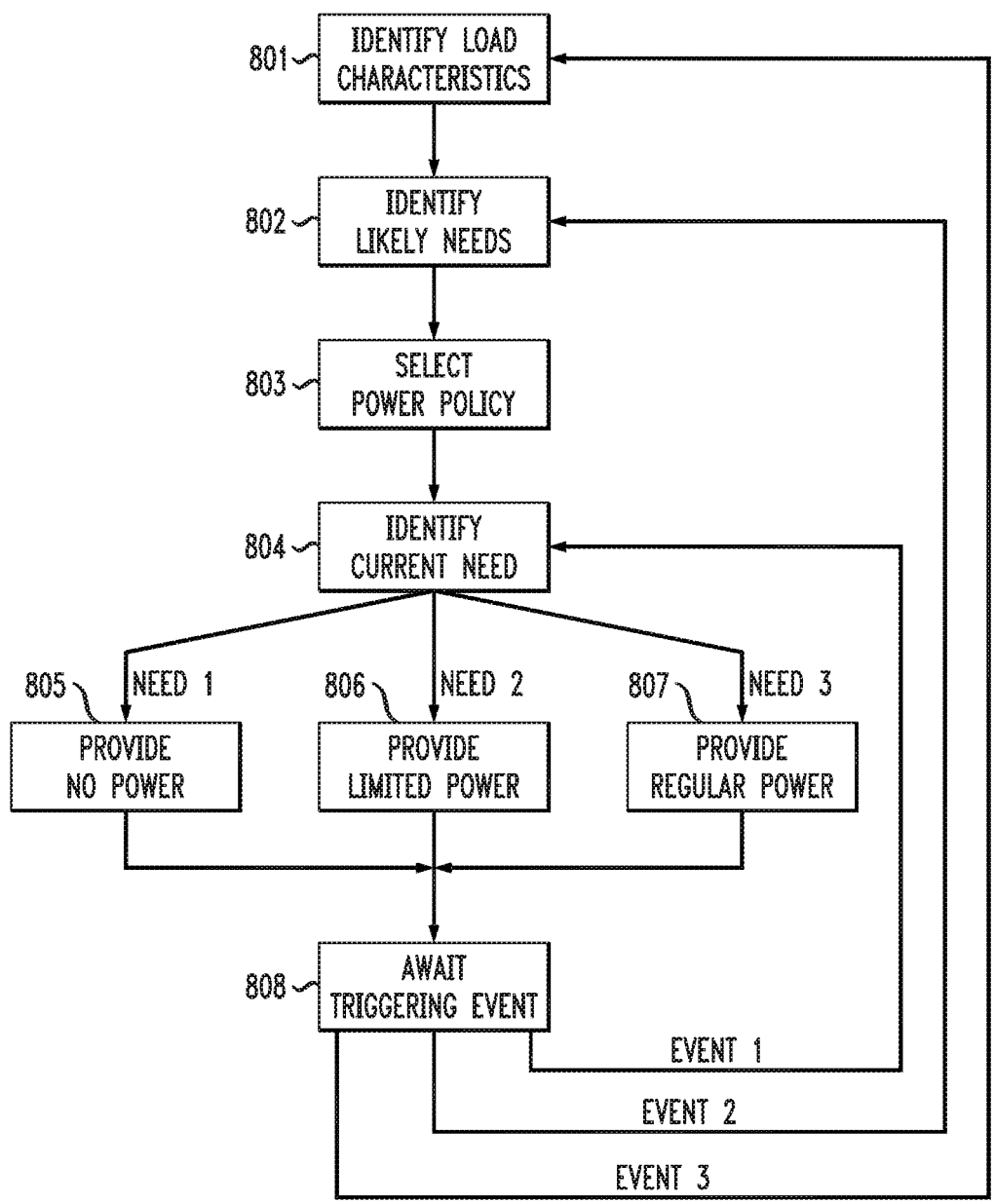
FIG. 8 is a flow diagram of an example power management process utilizing one or more of the waveforms of FIGS. 1 through 7 in an illustrative embodiment.

FIG. 8 illustrates an exemplary power management process. In step 801, the system identifies the load characteristics of an appliance or other device, illustratively using the methods described above, possibly in conjunction with other techniques such as those disclosed in the above-cited PCT International Application No. PCT/US17/46533. This may involve performance of a test, with the result of the test being a first classification of the appliance or other device. In step 802, the system identifies the likely needs of the appliance or other device, based at least in part on the first classification, as well as additional information such as historical power consumption metrics associated with the appliance or other device, data related to the historical use of the space in which the appliance or other device is connected, data obtained from a user, and/or data obtained from a look-up table comprising information relating to the likely appliance or other device associated with the load characteristics. The identification of the likely needs comprises a second classification.

In step 803, the system selects a power policy based at least in part the first classification and the second classification, for example, by accessing a look-up table that is searchable based on data associated with the first and/or second classification options. In step 804, current needs are determined, based at least on the selected power policy and optional detected events, leading to a selection of at least one power decision, corresponding to Need 1, Need 2 and Need 3. If Need 1 is selected, the system performs step 805, in which it provides no power to the appliance or other device; if Need 2 is selected, the system performs step 806, in which it provides limited power to the appliance or other device; and if Need 3 is selected, the system in step 807 provides regular power to the appliance or other device.

The controlled selective provision of no power in step 805, limited power in step 806 and regular power in step 807 are examples of what is more generally referred to herein as controlling application of a corresponding one of a plurality of different available levels of power to an appliance or other device. These and other different levels of power can be provided, for example, by selection and/or manipulation of different ones of the AC source waveforms previously described in conjunction with FIGS. 1 through 7. Accordingly, the regular power in step 807 can be provided using the unmodified standard AC source waveform of FIG. 1, while the limited power in step 806 can be provided using the amplitude-reduced AC source waveform of FIG. 2, the amplitude-chopped AC source waveform of FIG. 3, or another one of the AC source waveforms shown in another one of the figures, possibly with additional or alternative modification of source waveform characteristics such as amplitude, phase, wave shape, continuity, timing, and/or frequency. Different levels of power can therefore be provided in many different ways using the techniques disclosed herein, and the term "power level" as used herein is therefore intended to be broadly construed. Again, these and other references herein to AC sources are non-limiting, and the disclosed techniques can utilize DC sources in the case of DC-powered appliances and other devices.

In step 808, the system detects a triggering event. Examples of such events include but are not limited to the passing of a preset amount of time; the detection of a sensor input in the space associated with the appliance or other device; the detection of a changing power need for the appliance or other device; a user input or action; and a change of environmental conditions. Depending on the type of event detected and the selected power policy, the system changes state. If Event 1 is detected, the system branches to step 804; if Event 2 is detected, the system branches to step 802; and if Event 3 is detected then the system branches to step 801.

The association of events and branching selection typically depends on the selected power policy. For example, if the power policy is associated with an outdoor hot tub, the system may have performed step 805 before moving to step 808, and Event 1 corresponds to a change in temperature or passing of a preset amount of time. In this example, there may not be any Event 2 or Event 3. In another example, if the power policy corresponds to a portable fan, the system may have performed step 805 before moving to step 808, and Event 1 may be associated with a first sensor input indicating that the temperature exceeds a threshold and a second sensor input indicating that a person is present in the space where the fan is located.

Alternatively, the system may have performed step 806 to provide the fan with limited power, after which the system moves to step 808 to await an alternative Event 1 corresponding to a changed power draw of the fan. If the system identifies that the fan is no longer connected to the outlet, then the system may attempt to detect when the same (or a different) fan is plugged in again, whether at the same outlet or another outlet associated with the system; when this takes place, the system identifies the load characteristics to determine that the fan has been moved. Thus, the detection of the disconnecting of the fan, in this example, corresponds to an Event 3.

When the system performs step 807, for a given context corresponding to one outlet or switch, full power is provided to the associated appliance or other device. If the system determines, after moving to step 808, that the appliance or other device no longer draws power in an amount that corresponds to being actively in use, then this is a triggering event, and may cause the transition of state to step 801, 802 or 804, based on the selected power policy, the exact nature of the detected event, as well as optional auxiliary system inputs such as user inputs.

Figure 9:
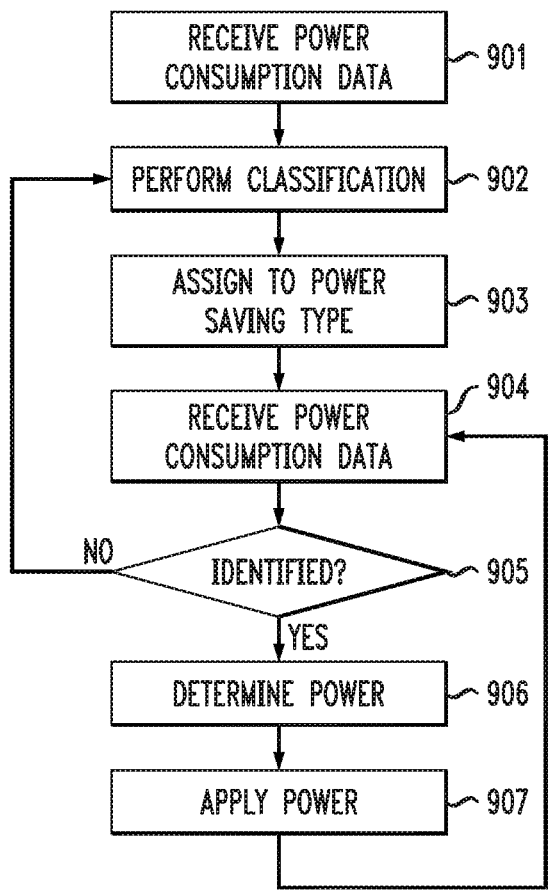
FIGS. 9 through 13 are flow diagrams of other example power management processes in illustrative embodiments.

FIG. 9 illustrates a process of determining what power to provide to a power consuming entity, such as an appliance. In step 901, an evaluation unit receives power consumption data related to the power consuming entity. The evaluation unit may be housed, for example, in an outlet associated with the power consuming entity, in a switch installed on the path between the source of power and the power consuming entity, or in a central location, such as a local processing entity associated with one or more installations or in a cloud processing unit receiving data from one or more installations. The power consumption data may comprise, for example, time series data relating to the usage of power; the determined voltage; the current being delivered; and/or data associated with the control of the power consuming entity. However, it is to be appreciated that the term "power consumption data" as used herein is intended to be broadly construed, and is not limited to these or any other particular data types or formats, but more generally encompasses a wide variety of different arrangements of information that are indicative of power consumption by an appliance or other device.

In step 902, a classification of the power consuming entity is performed. Based on the observed power consumption data, the evaluation unit or an associated processing unit in step 902 determines the likely type of appliance or other device that corresponds to the power consuming entity. For example, based on the power consumption time series, the evaluation unit may determine that the appliance is a likely refrigerator or freezer; this would correspond to a signature of a compressor and associated fan. As another example, the evaluation unit may determine that the power consuming entity is likely to be a fan, based on a power consumption signature of a fan. If the fan later is turned off, the evaluation unit may determine that it is likely that it is still plugged in, e.g., based on the much lower magnitude power consumption that matches that of an electric engine of a size of a typical fan. As yet another example, the evaluation unit determines that the power consuming entity is a water circulation pump. This may be determined based on the power consumption pattern, potential data related to the use of hot water or heating of water, as well as thermostat settings, temperature data, and motion data indicating that a person may be in a location where hot water is used.

In step 903, the evaluation unit maps the classified power consuming device to a power saving type. The power saving type corresponds to how power later will be controlled. It also indicates whether iterated re-classifications have to be made, how often these have to be made, and/or the particular circumstances under which they have to be made. For example, a refrigerator is typically not moved from one outlet to another; therefore, once a power consuming unit associated with a given power line has been classified as a refrigerator, it does not need to be re-classified. However, a fan may be frequently moved, e.g., from a bedroom at night to the living room during the day. Therefore, determining that a power consuming device is a fan means that it may be moved, and another appliance or other device may be plugged in to the associated outlet or power line. If an installer has indicated that it is a stationary fan, such as a ceiling fan, this does not need to be done.

In step 904, additional power consumption data is received and analyzed and in step 905, it is determined whether it matches an already identified power consuming unit. If it does, the evaluation unit or an associated control unit determines in step 906 what power (e.g., power profile) to apply to the power consuming unit, based on the power consumption data of step 904, the classification of step 902, the assigned power saving type of step 903, and the associated identification of step 905. If the determination in step 905 indicates that the additional power consumption data of step 904 does not match an already identified power consuming unit, the process returns to step 902.

Additional data may also be used for the power determination, such as motion data, presence data, data related to emergency situations, etc. For example, a water circulation pump may be given power only if the time of the day matches a time of the day when hot water is commonly used in the installed environment and at least one person has been detected to be present; or if at least one person has been detected in a location where hot water is normally used, such as in a bathroom. The hot water circulation pump would be turned off if the system is in a power savings mode, e.g., if it operates on a backup battery mode. As another example, a device that is determined to likely correspond to a router or other electronic device with near-constant use may be powered no matter what, whereas a refrigerator may be allowed to heat up slightly above its normal temperature during peak energy price times, and may be cooled down slightly below its normal temperature before such times. When the fan is not used, the voltage may be reduced to a lower voltage until an operation (on such a lowered voltage) is detected, at which time the voltage is increased to the normal level. These are operations that reduce the losses due to phantom power. The determined power profile from step 906 is used to apply a corresponding setting in step 907.

Figure 10:
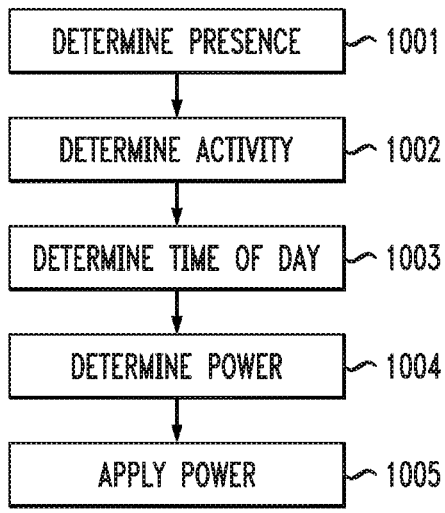

FIG. 10 illustrates an example process that may be applied after an identification has been performed, as described in FIG. 9. This example process is described below in the context of controlling a warm water circulation pump, but can be similarly applied to manage power for a wide variety of other devices.

In step 1001, the system determines the presence of people in an area associated with the system, which may be a home or an enterprise location. This may indicate, for example, that there is at least one person present. In step 1002, an activity is determined. In conjunction with the presence information, the system can determine the location of this at least one person and a likely activity. For example, it may indicate that there is at least one person watching a movie in the TV room; at least one person sleeping in the bedroom; at least one person moving around from room to room; and/or at least one person in a bathroom. The time of day is also determined, as indicated in step 1003.

In the case of all people present being in the TV room, this corresponds to a low-need scenario for hot water. In other words, this corresponds to a situation where the water circulation pump does not need to be used, as it is unlikely that hot water will be needed. In the case of all people being asleep, this is also an indication of low need, except if the time (determined in step 1003) is close to the time that people normally wake up and take a shower. In the case of a person walking around, this indicates a higher likelihood of hot water being needed, and the pump may be used intermittently to make sure that the water temperature in the pipes does not fall too much. If a person were to enter the bathroom, the likelihood that hot water is needed is high, and the circulation pump should start.

Based on the presence determination of step 1001, the activity determination of step 1002 and the time determination of step 1003, a power configuration is determined in step 1004. This configuration is applied in step 1005.

Figure 11:
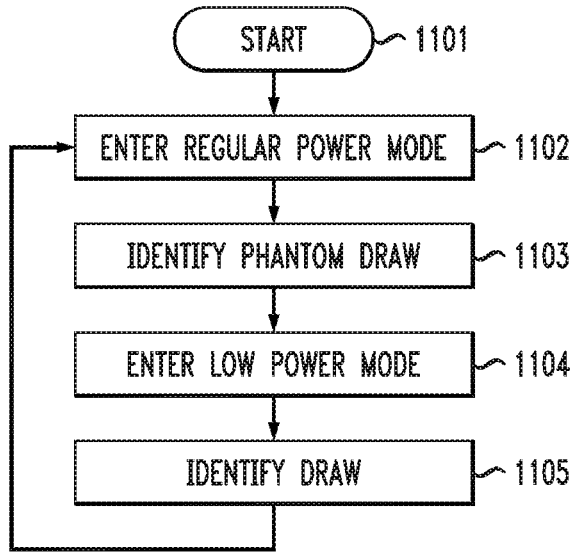

FIG. 11 illustrates a second example process that may be applied after an identification has been performed, as described in FIG. 9. This particular example is described in the context of reducing losses due to phantom power for a power consuming device such as a fan, but is suitable for numerous other contexts.

At step 1101, the process starts. At step 1102, the power mode is set to normal, which means that the outlet or wire is provided with 110V or 220V according to the local specifications and supply. At step 1103, phantom power draw is detected. This may correspond to a current below the threshold of common usage, but above zero. Alternatively, a significant drop of current is detected. In response to detecting phantom power draw, which illustratively corresponds, for example, to the significant drop of current, the system switches to a low power provision in step 1104. Accordingly, the power supply is changed, e.g., to 10V. This is sufficient to power the fan, but not in a manner that would be desirable to the user. However, it dramatically reduces the consumption of phantom power. In step 1105, an increase of current is detected; this corresponds to the fan being switched on by the user. Accordingly, the system switches the power supply to regular power mode in step 1102, and the operation of the fan immediately returns to normal. For a ceiling mounted fan that is used for only portions of the day during the warm months, this approach saves substantial amounts of power.

In the FIG. 11 process, identifying power draw in step 1105 illustratively corresponds to determining that an appliance has been actuated by a user (e.g., the user has turned the appliance on), after the appliance having been previously placed in the low power mode in step 1104. The low power mode in step 1104 can therefore be viewed as one in which the power is turned down rather than turned off, in effect implementing what may be referred to herein as a "sleepy switching on." In this low power mode, the appliance may not work properly, but the switching can be remotely detected, and power applied.

Figure 12:
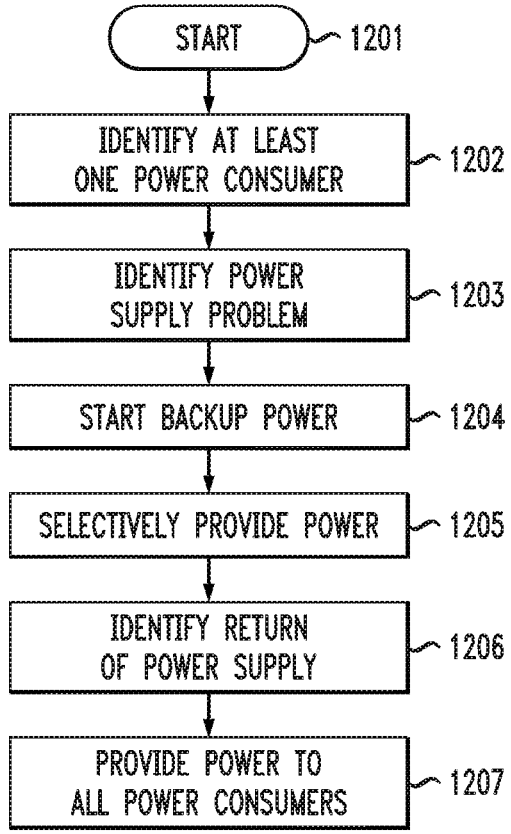

FIG. 12 illustrates example process in which power is selectively provided to certain power consumers. In step 1201, the process is started. In step 1202, the system identifies at least one power consumer. A power consumer as that term is broadly used herein can comprise, for example, a device, an appliance, or a collection of entities connected to an outlet. Examples of appliances and other devices include refrigerators, warm water circulation pumps, aquarium equipment, a hot tub, a router, a computer, a fan, a motorized window opener, an electric lock, surveillance equipment and other burglar alarm equipment, and many others.

The identification may be performed by a user inputting a classification, e.g., selecting from a menu that one circuit is associated with a hot tub, another circuit comprises an outlet to which a refrigerator is connected, and yet another circuit is not dedicated to a given power consuming unit. The identification may also be performed by the system identifying power consumption statistics, determining that a given circuit corresponds (at least at a certain time) with a very high probability to a fan, or that another appears, based on activity determinations, to correspond to food preparation, e.g., an outlet in a kitchen. The system may determine, for example, that one power consumer corresponds to a router, another power consumer corresponds to an air conditioner, and so on.

In step 1203, a power supply problem is identified. This may be done by determining that the supply is cut or reduced, a generator or backup battery is engaged, that a notification or warning is sent from a utility company, or by a user providing such input. In step 1204, backup power is started or accessed. In step 1205, the system selectively provides power to one or more power consumers. For example, the system may select to power any communications equipment, but not an air conditioner. The selection is based on factors such as the availability of backup power; the estimated duration of the power problem, if known; the types of identified power consuming entities, and their corresponding classification in terms of importance; as well as optional user input including override indications.

In step 1206, the system determines that the normal power supply has returned, and in step 1207, it provides power to all power consumers as opposed to only those that were selectively provided with power in step 1205.

Figure 13:
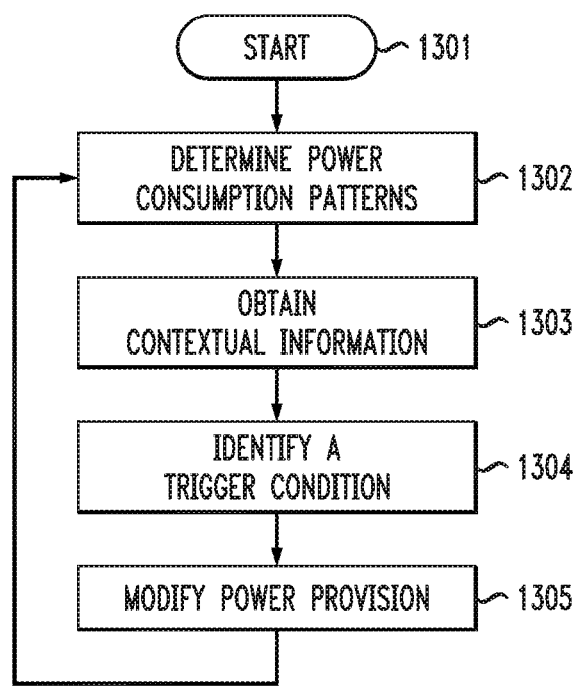

FIG. 13 illustrates an embodiment that includes a machine learning system. In step 1301, the system is started. In step 1302, the system determines power consumption patterns for a period of time. The patterns may be related to user actuation events such as turning on or off appliances, lights, or otherwise causing changes in power consumption patterns, e.g., by opening the door to a refrigerator. It may also be related to detected movements, such as a person entering a room; to a time of the day; to a temperature or weather condition; and/or to other sensory inputs of the system. A machine learning model is built to identify common inferences, each one of which can be associated with a probability.

The system, in step 1303, obtains contextual information related to a given system environment, corresponding to a collection of sensory inputs. From these, the system identifies a trigger condition, in step 1304, using the stored machine learning model generated in conjunction with step 1302. A trigger condition identified in step 1304 is used to select a power modification, and in step 1305, the system makes a modification to the power based on the trigger. For example, the trigger may correspond to a resident of the space having woken up, gotten dressed, and gone to the kitchen; the trigger may automatically cause the power to the coffee maker to be turned on, as that is what the person typically does after having gotten up and having gotten dressed.

The process of FIG. 13 can be viewed as an example arrangement that involves determining a context related to a user. For example, the system in this embodiment detects that there is someone in the bathroom, and based on this determined context, turns on the hot water circulation pump, as the person in the bathroom might want hot water.

The particular processing operations shown in the diagram of FIGS. 8 through 13 above are presented by way of example only, and should not be construed as limiting in any way. For example, the ordering of the steps in each of FIGS. 8 through 13 can be varied, and additional or alternative steps can be used in place of the particular steps shown. It is also possible that certain steps can be performed at least in part concurrently with one another instead of in the particular order illustrated in the flow diagrams.

Figure 14:
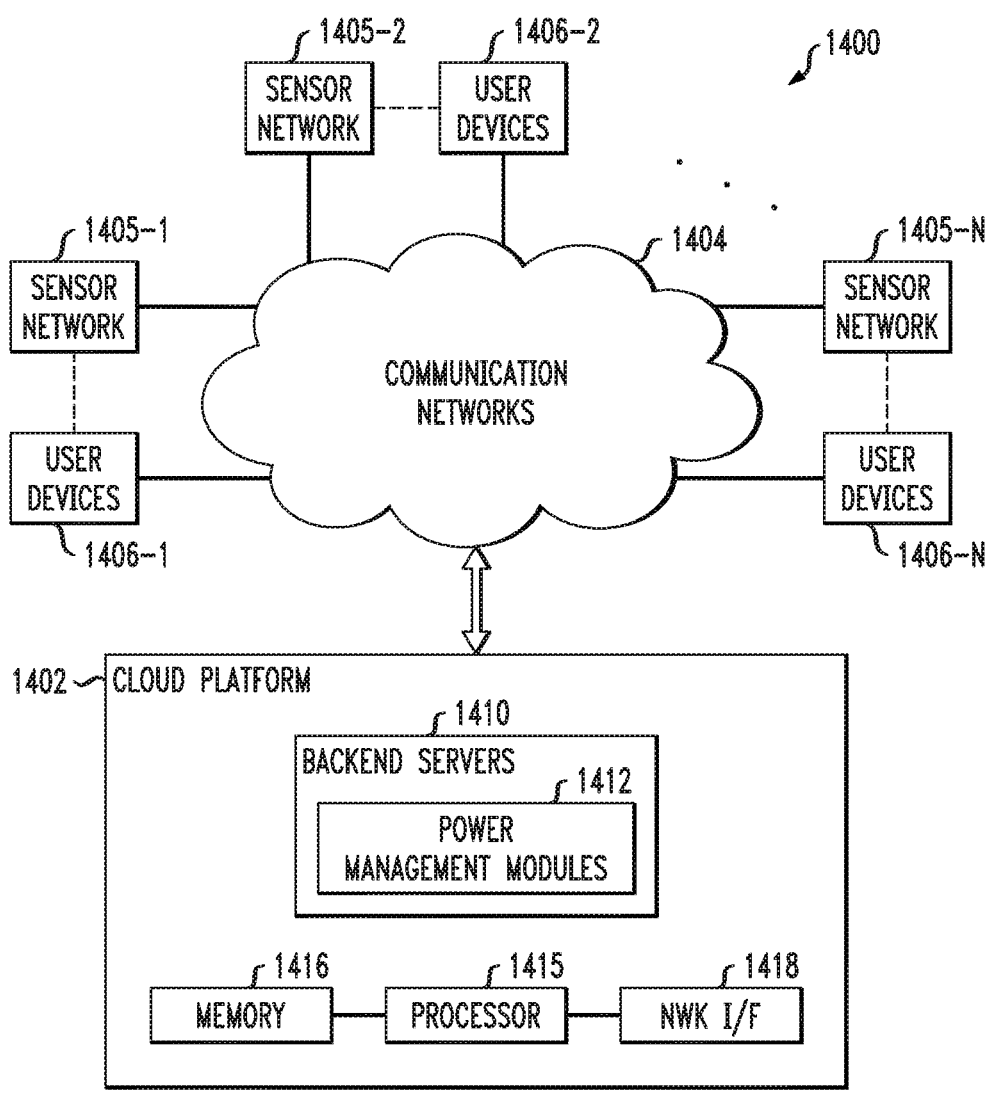
FIG. 14 is a block diagram of an information processing system that implements functionality for power management in an illustrative embodiment.

Referring now to FIG. 14, an example information processing system 900 of an illustrative embodiment is shown. The system 1400 in this embodiments is configured with functionality for power management in residential and/or commercial settings. For example, the system 1400 is illustratively configured to execute one or more processes of the type previously described in conjunction with FIGS. 8 through 13. As will be described in more detail below, the system 1400 illustratively comprises one or more node networks each comprising multiple nodes. Such node networks can include sensor networks that include IoT devices and other types of sensor devices, and can include other types of smart nodes, user devices and/or other power-controlled appliances or other devices. The node networks are considered examples of what are also referred to herein as residential and/or commercial networks.

The system 1400 in the present embodiment more particularly comprises a cloud platform 1402 coupled via one or more communication networks 1404 to a plurality of distinct sensor networks 1405-1, . . . 1405-N. Each such sensor network is assumed to comprise a set of sensor devices of the type described elsewhere herein. A given set of sensor devices is also referred to herein as a "collection" of sensor devices. The sensor networks 1405-1, . . . 1405-N interact with respective sets of user devices 1406-1, . . . 1406-N. The sets of user devices 1406 are not necessarily disjoint, as some of the user devices can interact with multiple ones of the sensor networks 1405. The user devices 1406 can comprise, for example, desktop, laptop or tablet computers, mobile telephones, smart watches, gaming systems or other types of devices associated with one or more system users and capable of communicating with cloud platform 1402 over the one or more communication networks 1404.

Some of the user devices 1406 comprise respective instances of what are generally referred to herein as "mobile devices" and those can include, for example, laptop or tablet computers, mobile telephones or smartphones, smart watches, etc. Other types of mobile devices can be used in other embodiments, and the term "mobile device" as used herein is therefore intended to be broadly construed.

The user devices 1406 are assumed to further comprise appliances and/or other devices that are subject to power control within the system 1400. In some embodiments, such appliances and/or other devices subject to power control include devices that are part of one or more of the sensor networks 1405.

Accordingly, an appliance or other device subject to power control in the system 1400 can include one of the user devices 1406, one of the sensor devices of one of the sensor networks 1405, or another type of device not explicitly shown in the figure.

The appliances and/or other devices subject to power control in some embodiments herein are referred to as "monitored devices" and/or "classified devices" in conjunction with implementation of power control functionality.

The dashed lines between the user devices 1406 and the sensor networks 1405 are intended to encompass a wide variety of different types of interaction that can be supported in a given implementation. Such interactions are not limited to machine-to-machine communications using wired or wireless communication protocols, but more generally encompass visual, aural, haptic and/or other types of interaction. For example, a sensor device can present an image to a user via a display, and/or play an audio file to a user via a speaker, in conjunction with the implementation of one or more processes for power management as described elsewhere herein.

The cloud platform 1402 illustratively comprises a processing platform that includes one or more processing devices. For example, the cloud platform 1402 can be implemented as one or more computers, servers or other backend devices that are configured to interact with the sensor networks 1405 and the user devices 1406. In other embodiments, multiple cloud platforms can be provided, each having responsibility for power management for appliances/devices associated with a different one of the sensor networks 1405. The cloud platform 1402 can include additional or alternative components, such as, for example, a database or other repository of the type referred to elsewhere herein. The term "cloud platform" as used herein is intended to be broadly construed, so as to encompass a computer, server or backend device coupled to a network, and should not be viewed as requiring any particular geographical relationship relative to the particular sensor networks 1405 for which it is responsible. It is illustratively configured to provide a common control point for power management of appliances/devices associated with one or more of the sensor networks 1405.

Similarly, the term "backend server" as used herein is intended to be broadly construed, so as to encompass a server that is reachable over a network connection from node of a node network, which may comprise a user device, a sensor device, or another type of device, and performs various functions relating to power management of appliances and other devices associated with one or more of the sensor networks 1405. The backend servers 1410 implement power management modules 1412 that are configured to perform operations of at least a portion of one or more of the processes of FIGS. 8 through 13.

Various types of additional or alternative functionality may be performed by the backend servers 1410 in conjunction with power management, such as, for example, executing server-side portions of authentication and verification protocols that are carried out in conjunction with establishing associations between particular sensor devices or other types of nodes and a user account.

The "user" associated with a particular user account may be an individual human being, such as a homeowner, tenant or installer, but the term "user" should be understood to include other types of entities, including by way of example, hardware and/or software entities, such as robots and other automated entities configured with machine learning functionality or other forms of artificial intelligence. A given such user illustratively has at least one communication address (e.g., IP address, email address, mobile telephone number, etc.) or other contact information recorded with the cloud platform 1402 in association with the user account. Such a user may but need not have previously gone through a registration process with the cloud platform 1402. Instead, by way of example, contact information for that user may have been provided by another user that has gone through a registration process. Other techniques can be used to register users as that term is broadly used herein.

One or more of the sensor networks 1405 may each comprise a plurality of sensor devices deployed within an interior space and/or an exterior space of building or other structure associated with a residence or business. Such sensor devices are considered examples of what are more generally referred to herein as "nodes" of a set of nodes. The "nodes" as that term is broadly used herein can include smart nodes with limited user interfaces, smart nodes with more complex user interfaces, smart nodes with no user interfaces, and other types of nodes, as well as various combinations thereof. Numerous other arrangements are possible.

The system 1400 advantageously provides substantial reductions in phantom power through the disclosed power management of appliances and/or other devices associated with the sensor networks 1405. It is to be appreciated, however, that other types of sensor systems, and more generally other sets of nodes, can be utilized in other embodiments. Accordingly, embodiments disclosed herein should not be viewed as being limited in any way to use with particular types of sensor systems. The particular types of appliances/devices subject to power control can vary from embodiment to embodiment, and can include appliances/devices of the type described elsewhere herein.

As indicated above, the cloud platform 1402 in the present embodiment comprises a plurality of backend servers 1410 that implement power management modules 1412 for implementing power management functionality within the system 1400.

The backend servers 1410 and their associated power management modules 1412 of the cloud platform 1402 are illustratively implemented at least in part in the form of software running on one or more processing devices, each of which includes a processor 1415 coupled to a memory 1416 and a network interface ("Nwk I/F") 1418. Example implementations of such components are described in more detail below.

Although power management modules 1412 are shown in FIG. 14 as being implemented in the backend servers 1410 of the cloud platform 1402, this is by way of illustrative example only, and such power management modules can additionally or alternatively be implemented elsewhere within the system 1400, such as in local processing entities each associated with one or more nodes of a node network comprising one or more of the sensor networks 1405. A given such local processing entity of the system 1400 can in some embodiments comprise a particular node of a node network, a set of multiple nodes of a node network, or other types and arrangements of devices, such as one or more of the sensor devices of the sensor networks 1405 or one or more of the user devices 1406.

In operation, at least one processing device of the system 1400, such as a particular computer or other processing device that implements a given one of the backend servers 1410 of the cloud platform 1402, or a particular computer or other processing device that implements a given one of the above-noted local processing entities of the system 1400, is configured to receive power consumption data relating to at least one monitored device, to classify the monitored device based at least in part on the power consumption data, to select a power policy for the classified device, and to control application of power to the classified device in accordance with the selected power policy.

Such power consumption data is illustratively received in one or more of the backend servers 1410 from a node network associated with the monitored device. The one or more servers are configured to automatically perform at least portions of the receiving, classifying, selecting and controlling through interaction with one or more nodes of the node network, although other arrangements are possible. At least portions of the above-noted receiving, classifying, selecting and controlling operations are illustratively repeated responsive to detection of a designated triggering event, such as a particular one of the triggering events previously described in conjunction with step 808 of the example process of FIG. 8.

The power consumption data in some embodiments is received from one or more sensor devices of at least one of the sensor networks 1405. At least one of the sensor devices in some embodiments can comprise, for example, at least one of a power source, a power outlet and a power switch, where the power source, power outlet and/or power switch illustratively being configured to modify an amount of power provided to the monitored device responsive to at least one received control signal.

As indicated previously, such sensor devices are examples of what are more generally referred to herein as "nodes" and the corresponding sensor networks are examples of what are more generally referred to herein as "node networks." It is therefore to be appreciated that other types of nodes and node networks can be used in other embodiments.

A given "control signal" as the term is broadly used herein can comprise, for example, one or more commands, such as, for example, a single command directed to a particular node, multiple commands directed to a particular node, or different sets of one or more commands directed to respective nodes, in one or more node networks.

The monitored device is classified in some embodiments by performing a first classification based at least in part on load characteristics obtained from the power consumption data, and performing a second classification based at least in part on likely power needs of the monitored device. Selection of a power policy for the classified device in such an embodiment is based at least in part on results of the first and second classifications. An illustrative example of a particular arrangement of this type was previously described in conjunction with the process of FIG. 8.

In some embodiments, controlling application of power to the classified device in accordance with the selected power policy illustratively comprises determining contextual information for the classified device, generating a control signal based at least in part on the contextual information and the selected power policy, and transmitting the control signal to at least one node of a node network associated with the classified device.

Additionally or alternatively, controlling application of power to the classified device in accordance with the selected power policy illustratively comprises detecting a condition associated with a particular one of a plurality of possible power needs of the classified device under the selected power policy, and controlling application of a corresponding one of a plurality of different available levels of power to the classified device responsive to the detected condition. The plurality of different available levels of power illustratively comprises two or more of at least a first level providing no power, a second level providing limited power below a regular level of power for the classified device, and a third level providing the regular level of power. With reference to the example process of FIG. 8, these different levels correspond generally to respective steps 805, 806 and 807.

In some embodiments, the plurality of different available levels of power comprises at least two different power levels provided using at least one of respective different source waveforms and respective different source waveform characteristics, such as different selections and/or modifications of AC source waveforms as previously described in conjunction with FIGS. 1 through 7.

Numerous other types of power management functionality can be implemented using the power management modules 1412 of system 1400.

For example, controlling application of power to the classified device in accordance with the selected power policy in some embodiments comprises controlling initiation of a low power mode for the classified device, at a level of power below a regular level of power associated with a regular power mode for the classified device, detecting actuation of the classified device, and controlling a transition from the low power mode to the regular power mode responsive to the detected actuation. An example of such an arrangement was previously described in conjunction with the process of FIG. 11.

Additionally or alternatively, controlling application of power to the classified device in accordance with the selected power policy can comprise selectively applying power to a first classified device of a first type to the exclusion of one or more other classified devices of different types than the first type. An example of such an arrangement was previously described in conjunction with the process of FIG. 12.

In other embodiments, controlling application of power to the classified device in accordance with the selected power policy comprises implementing a machine learning system that learns a power consumption pattern of the classified device over time, and controlling application of power to the classified device based at least in part on the selected power policy and the power consumption pattern. An example of such an arrangement was previously described in conjunction with the process of FIG. 13.

In some embodiments, the cloud platform 1402 comprises or is otherwise associated with a central authority or other trusted party responsible for configuration and management of one or more of the sensor networks 1405 or other node networks of the system 1400. The above-noted processing device illustratively implements at least a portion of the cloud platform 1402, such as one or more of the backend servers 1410, or one or more local processing entities of the system 1400. Multiple processing devices can also be used for such implementations, in place of a single processing device.

The particular features and other advantages described above are examples presented in the context of illustrative embodiments, and therefore such features and advantages need not be present in other embodiments. Such features and advantages of illustrative embodiments should not be viewed as limiting in any way.

For example, references herein to "a system" or "the system" in conjunction with various distinct types of features or functionality should not be construed as a requirement that all such features or functionality be present within the same single system. Instead, different systems in different embodiments can include different combinations or other arrangements of the various disclosed features and functionality.

Also, references herein to particular features or other aspects as being "optional" refer to utilization in one or more particular embodiments, and should not be construed as an indication that any other features or aspects, such as features or aspects not explicitly referred to as optional, are required in any particular embodiments.

Illustrative embodiments disclosed herein include systems, methods, apparatus and computer program products comprising non-transitory storage media storing program code.

The above-described system and other processing entities described herein may be part of an information processing system. A given such entity in an information processing system as described herein is illustratively configured utilizing a corresponding processing device comprising a processor coupled to a memory. The processor executes software program code stored in the memory in order to control the performance of processing operations and other functionality. The processing device also comprises a network interface that supports communication over one or more networks.

The processor may comprise, for example, a microprocessor, a microcontroller, an application-specific integrated circuit (ASIC), a field-programmable gate array (FPGA), a central processing unit (CPU), an arithmetic logic unit (ALU), a digital signal processor (DSP), a graphics processing unit (GPU) or other similar processing device component, as well as other types and arrangements of processing circuitry, in any combination.

The memory stores software program code for execution by the processor in implementing portions of the functionality of the processing device. A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, read-only memory (ROM), flash memory, magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with the embodiments described herein.

Processing devices in a given embodiment can include, for example, laptop, tablet or desktop personal computers, mobile telephones, or other types of computers or communication devices, in any combination. As indicated previously, processing devices can comprise respective servers.

Communications between the various elements of an information processing system comprising processing devices associated with respective parties or other system entities may take place over one or more networks. Such networks can illustratively include, for example, a global computer network such as the Internet, a wide area network (WAN), a local area network (LAN), a satellite network, a telephone or cable network, a cellular network such as a 4G or 5G network, a wireless network implemented using a wireless protocol such as Bluetooth, NFC, WiFi or WiMAX, or various portions or combinations of these and other types of communication networks.

An information processing system as disclosed herein may be implemented using one or more processing platforms, or portions thereof.

For example, one illustrative embodiment of a processing platform that may be used to implement at least a portion of an information processing system comprises cloud infrastructure including virtual machines implemented using a hypervisor that runs on physical infrastructure. Such virtual machines may comprise respective processing devices that communicate with one another over one or more networks.

The cloud infrastructure in such an embodiment may further comprise one or more sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the information processing system.

Another illustrative embodiment of a processing platform that may be used to implement at least a portion of an information processing system as disclosed herein comprises a plurality of processing devices which communicate with one another over at least one network. As indicated previously, the network may comprise any type of network, including by way of example a global computer network such as the Internet, a WAN, a LAN, a satellite network, a telephone or cable network, a cellular network such as a 4G or 5G network, a wireless network implemented using a wireless protocol such as Bluetooth, NFC, WiFi or WiMAX, or various portions or combinations of these and other types of communication networks.

Each processing device of the processing platform comprises a processor coupled to a memory. As indicated above, the processor may comprise a microprocessor, a microcontroller, an ASIC, an FPGA, a CPU, an ALU, a DSP, a GPU or other type of processing circuitry, as well as portions or combinations of such circuitry elements. The memory may comprise RAM, ROM, flash memory or other types of memory, in any combination.

Again, the memory and other memories disclosed herein should be viewed as illustrative examples of what are more generally referred to as "processor-readable storage media" storing program code of one or more software programs.

As mentioned previously, articles of manufacture comprising such processor-readable storage media are considered embodiments of the present invention. A given such article of manufacture may comprise, for example, a storage array, a storage disk, an integrated circuit containing RAM, ROM, flash memory or other electronic memory, or any of a wide variety of other types of computer program products.

Also included in the processing device is network interface circuitry, which is used to interface the processing device with the network and other system components, and may comprise conventional transceivers.

Again, these particular processing platforms are presented by way of example only, and an information processing system may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure in place of or in addition to virtualization infrastructure comprising virtual machines, such as operating system level virtualization infrastructure comprising Docker containers or other types of containers implemented using respective Linux kernel control groups. Thus, it is possible in some embodiments that system components can run at least in part in cloud infrastructure or other types of virtualization infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system. Such components can communicate with other elements of the information processing system over any type of network or other communication media.

As indicated previously, components or functionality of systems as disclosed herein can be implemented at least in part in the form of one or more software programs stored in memory and executed by a processor of a processing device.

Accordingly, a given component of an information processing system implementing functionality as described herein is illustratively configured utilizing a corresponding processing device comprising a processor coupled to a memory. The processor executes program code stored in the memory in order to control the performance of processing operations and other functionality. The processing device also comprises a network interface that supports communication over one or more networks.

The particular configurations of information processing systems described herein are exemplary only, and a given such system in other embodiments may include other elements in addition to or in place of those specifically shown, including one or more elements of a type commonly found in a conventional implementation of such a system.

For example, in some embodiments, an information processing system may be configured to utilize the disclosed techniques to provide additional or alternative functionality in other contexts. The disclosed techniques can be similarly adapted for use in a wide variety of other types of information processing systems.

It is also to be appreciated that the particular process steps used in the embodiments described above are exemplary only, and other embodiments can utilize different types and arrangements of processing operations. For example, certain process steps described as being performed serially in the illustrative embodiments can in other embodiments be performed at least in part in parallel with one another. The ordering of such process steps can also be varied relative to their ordering in illustrative embodiments.

It should again be emphasized that the embodiments of the invention as described herein are intended to be illustrative only. Other embodiments of the invention can be implemented utilizing a wide variety of different types and arrangements of information processing systems, networks and processing devices than those utilized in the particular illustrative embodiments described herein, and in numerous alternative power management related processing contexts. Also, the particular types and configurations of system entities, processing devices and process operations can be varied in other embodiments. In addition, the particular assumptions made herein in the context of describing aspects of certain illustrative embodiments need not apply in other embodiments. These and numerous other alternative embodiments will be readily apparent to those skilled in the art.

What is claimed is:

1. An apparatus comprising:
   at least one processing device comprising a processor coupled to a memory;
   said at least one processing device being configured:
      to receive power consumption data relating to at least one monitored device;
      to classify the monitored device based at least in part on the power consumption data;
      to select a power policy for the classified device; and
      to control application of power to the classified device in accordance with the selected power policy;
   wherein classifying the monitored device based at least in part on the power consumption data comprises determining that the monitored device has been moved from a first location to a second location based at least in part on assessing a likelihood of the monitored device being moved from the first location; and
   wherein at least portions of the receiving, classifying, selecting and controlling are repeated responsive to detection of one or more designated triggering events, at least a given one of the one or more designated triggering events being based at least in part on the assessed likelihood of the monitored device being moved from the first location.

2. The apparatus of claim 1 wherein receiving power consumption data relating to at least one monitored device comprises receiving power consumption data from a node network associated with the monitored device.

3. The apparatus of claim 2 wherein said at least one processing device comprises one or more servers coupled to the node network wherein the one or more servers are configured to automatically perform at least portions of the receiving, classifying, selecting and controlling through interaction with one or more nodes of the node network.

4. The apparatus of claim 2 wherein the node network comprises a sensor network that includes a set of sensor devices with at least one of the sensor devices being configured to provide the power consumption data.

5. The apparatus of claim 4 wherein said at least one sensor device configured to provide the power consumption data comprises at least one of a power source, a power outlet and a power switch, and further wherein said at least one of a power source, a power outlet and a power switch is configured to modify an amount of power provided to the monitored device responsive to at least one received control signal.

6. The apparatus of claim 1 wherein classifying the monitored device based at least in part on the power consumption data comprises:
  performing a first classification based at least in part on load characteristics obtained from the power consumption data; and
  performing a second classification based at least in part on likely power needs of the monitored device;
  wherein selection of a power policy for the classified device is based at least in part on results of the first and second classifications.

7. The apparatus of claim 1 wherein controlling application of power to the classified device in accordance with the selected power policy comprises:
  determining contextual information for the classified device;
  generating a control signal based at least in part on the contextual information and the selected power policy; and
  transmitting the control signal to at least one node of a node network associated with the classified device.

8. The apparatus of claim 1 wherein controlling application of power to the classified device in accordance with the selected power policy comprises:
  detecting a condition associated with a particular one of a plurality of possible power needs of the classified device under the selected power policy; and
  controlling application of a corresponding one of a plurality of different available levels of power to the classified device responsive to the detected condition.

9. The apparatus of claim 8 wherein the plurality of different available levels of power comprises two or more of at least:
  a first level providing no power;
  a second level providing limited power below a regular level of power for the classified device; and
  a third level providing the regular level of power.

10. The apparatus of claim 8 wherein the plurality of different available levels of power comprises at least two different power levels provided using at least one of respective different source waveforms and respective different source waveform characteristics.

11. The apparatus of claim 1 wherein controlling application of power to the classified device in accordance with the selected power policy comprises:
  controlling initiation of a low power mode for the classified device, at a level of power below a regular level of power associated with a regular power mode for the classified device;
  detecting actuation of the classified device; and
  controlling a transition from the low power mode to the regular power mode responsive to the detected actuation.

12. The apparatus of claim 1 wherein controlling application of power to the classified device in accordance with the selected power policy comprises selectively applying power to a first classified device of a first type to the exclusion of one or more other classified devices of different types than the first type.

13. The apparatus of claim 1 wherein controlling application of power to the classified device in accordance with the selected power policy comprises:
  implementing a machine learning system that learns a power consumption pattern of the classified device over time; and
  controlling application of power to the classified device based at least in part on the selected power policy and the power consumption pattern.

14. A method comprising:
  receiving power consumption data relating to at least one monitored device;
  classifying the monitored device based at least in part on the power consumption data;
  selecting a power policy for the classified device; and
  controlling application of power to the classified device in accordance with the selected power policy;
  wherein classifying the monitored device based at least in part on the power consumption data comprises determining that the monitored device has been moved from a first location to a second location based at least in part on assessing a likelihood of the monitored device being moved from the first location;
  wherein at least portions of the receiving, classifying, selecting and controlling are repeated responsive to detection of one or more designated triggering events, at least a given one of the one or more designated triggering events being based at least in part on the assessed likelihood of the monitored device being moved from the first location; and
  wherein the method is performed by at least one processing device comprising a processor coupled to a memory.

15. The method of claim 14 wherein controlling application of power to the classified device in accordance with the selected power policy comprises:
  determining contextual information for the classified device;
  generating a control signal based at least in part on the contextual information and the selected power policy; and
  transmitting the control signal to at least one node of a node network associated with the classified device.

16. The method of claim 14 wherein controlling application of power to the classified device in accordance with the selected power policy comprises:
  controlling initiation of a low power mode for the classified device, at a level of power below a regular level of power associated with a regular power mode for the classified device;
  detecting actuation of the classified device; and
  controlling a transition from the low power mode to the regular power mode responsive to the detected actuation.

17. A computer program product comprising a non-transitory processor-readable storage medium having stored therein program code of one or more software programs, wherein the program code when executed by at least one processing device causes said at least one processing device:
  to receive power consumption data relating to at least one monitored device;
  to classify the monitored device based at least in part on the power consumption data;
  to select a power policy for the classified device; and
  to control application of power to the classified device in accordance with the selected power policy;
  wherein classifying the monitored device based at least in part on the power consumption data comprises determining that the monitored device has been moved from a first location to a second location based at least in part on assessing a likelihood of the monitored device being moved from the first location; and wherein at least portions of the receiving, classifying, selecting and controlling are repeated responsive to detection of one or more designated triggering events, at least a given one of the one or more designated triggering events being based at least in part on the assessed likelihood of the monitored device being moved from the first location.

18. The computer program product of claim 17 wherein controlling application of power to the classified device in accordance with the selected power policy comprises:
   determining contextual information for the classified device;
   generating a control signal based at least in part on the contextual information and the selected power policy; and
   transmitting the control signal to at least one node of a node network associated with the classified device.

19. The computer program product of claim 17 wherein controlling application of power to the classified device in accordance with the selected power policy comprises:
   controlling initiation of a low power mode for the classified device, at a level of power below a regular level of power associated with a regular power mode for the classified device;
   detecting actuation of the classified device; and
   controlling a transition from the low power mode to the regular power mode responsive to the detected actuation.

20. The computer program product of claim 17 wherein the given one of the one or more designated triggering events comprises passing of a preset amount of time, wherein a length of the preset amount of time is set based at least in part on the assessed likelihood of the monitored device being moved from the first location.

21. The computer program product of claim 17 wherein determining that the monitored device has been moved from the first location to the second location is further based at least in part on detecting disconnection of the monitored device at the first location.

* * * * *